United States Patent
Turcovsky

(10) Patent No.: US 8,003,889 B2
(45) Date of Patent: Aug. 23, 2011

(54) CONDUIT SLEEVE PASS THROUGH FOR CONCRETE CONSTRUCTION

(75) Inventor: Gregory D. Turcovsky, Mentor, OH (US)

(73) Assignee: Thomas & Betts International, Inc., Memphis, TN (US)

( * ) Notice: Subject to any disclaimer, the term of this patent is extended or adjusted under 35 U.S.C. 154(b) by 574 days.

(21) Appl. No.: 12/184,647

(22) Filed: Aug. 1, 2008

(65) Prior Publication Data

US 2009/0032281 A1 Feb. 5, 2009

Related U.S. Application Data

(60) Provisional application No. 60/953,559, filed on Aug. 2, 2007.

(51) Int. Cl.
*H02G 15/18* (2006.01)
(52) U.S. Cl. ............... 174/83; 52/99; 138/89; 174/31 R
(58) Field of Classification Search .................. 174/83, 174/31 R; 52/99, 677; 138/89
See application file for complete search history.

(56) References Cited

U.S. PATENT DOCUMENTS

| | | | |
|---|---|---|---|
| 4,625,940 A | 12/1986 | Barton | |
| 5,182,885 A | 2/1993 | Barton, Jr. | |
| 5,245,806 A | 9/1993 | Baur et al. | |
| 5,509,240 A | 4/1996 | Barton, Jr. | |
| 6,061,990 A | 5/2000 | McMahon | |
| 6,668,864 B2 | 12/2003 | Shimizu | |
| 6,725,611 B2 | 4/2004 | DeFiglio | |
| 7,097,661 B2 * | 8/2006 | Perry | 623/10 |
| 7,581,362 B2 * | 9/2009 | Vaughan | 52/220.1 |

* cited by examiner

Primary Examiner — Dhirubhai R Patel
(74) Attorney, Agent, or Firm — Jones Day

(57) ABSTRACT

A conduit sleeve for a concrete pass through includes a tubular member having an inside diameter for receiving a cylindrical conduit at a forward end thereof. A flange is coupled to a rearward end of the tubular member. The flange is for coupling to a concrete form. A flexing structure is coupled to one or more of the tubular member and the flange for allowing the flange to be angled relative to the tubular member when the flange is installed on a concrete form. The tubular member is configured for receiving a conduit and the flexing structure allows the conduit to remain horizontal when there are variations in the angle of the form. Another conduit sleeve includes a coupling part, a flange, and a plurality of tabs that extend outwardly from the flange.

14 Claims, 32 Drawing Sheets

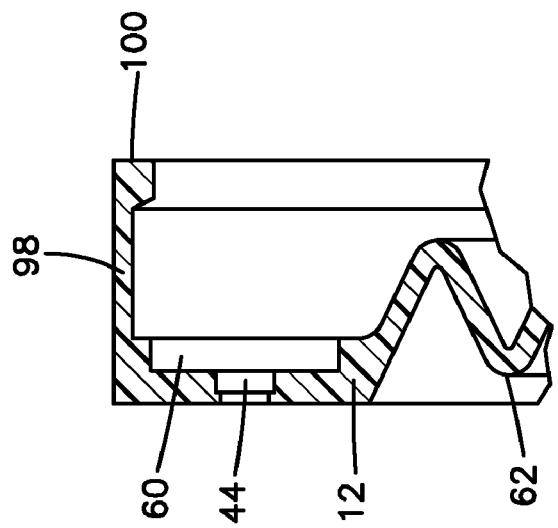
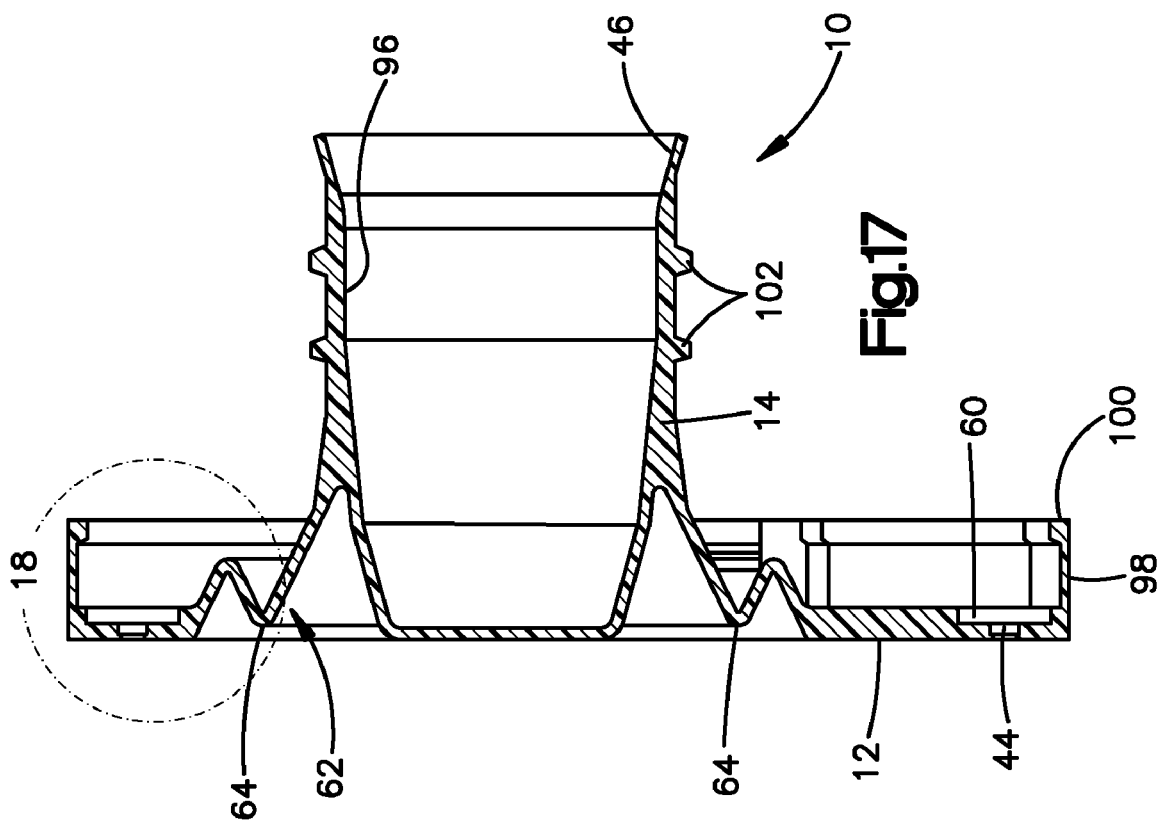

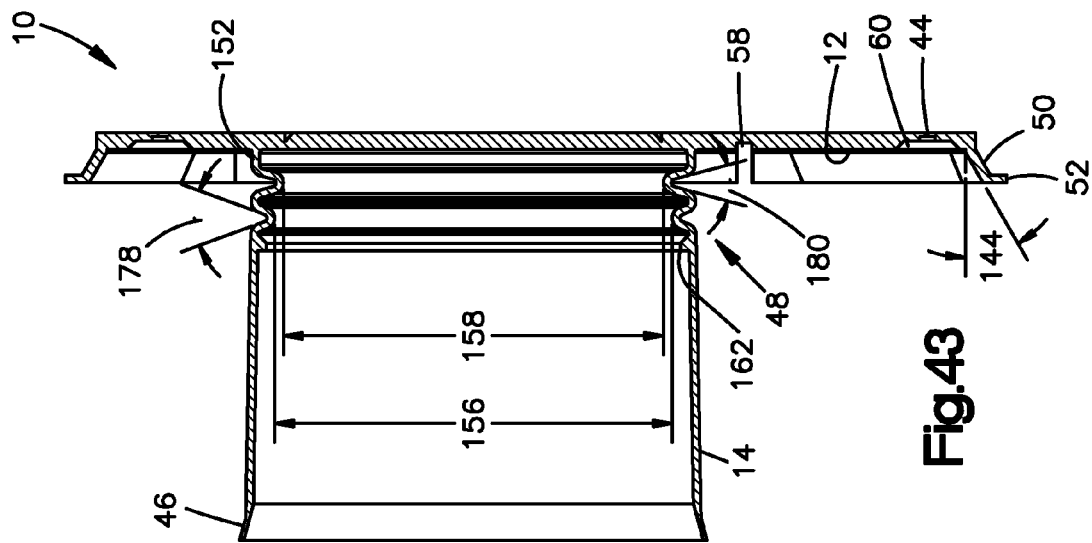
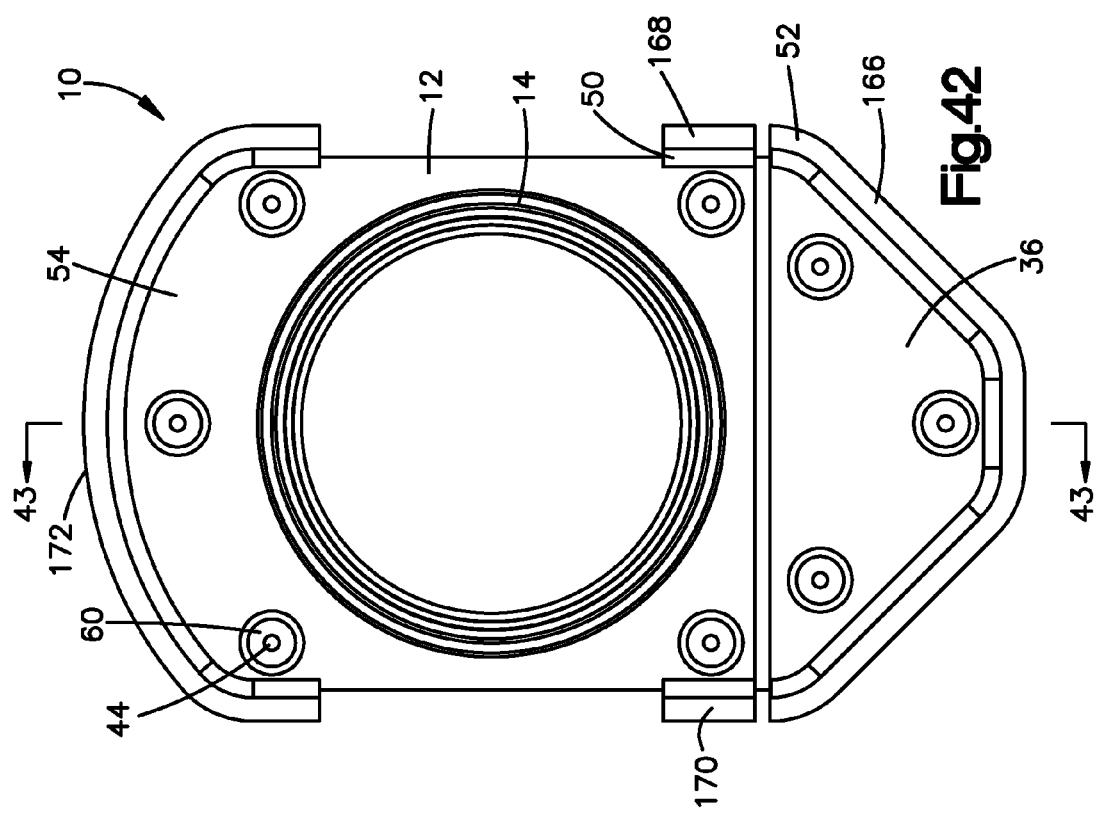

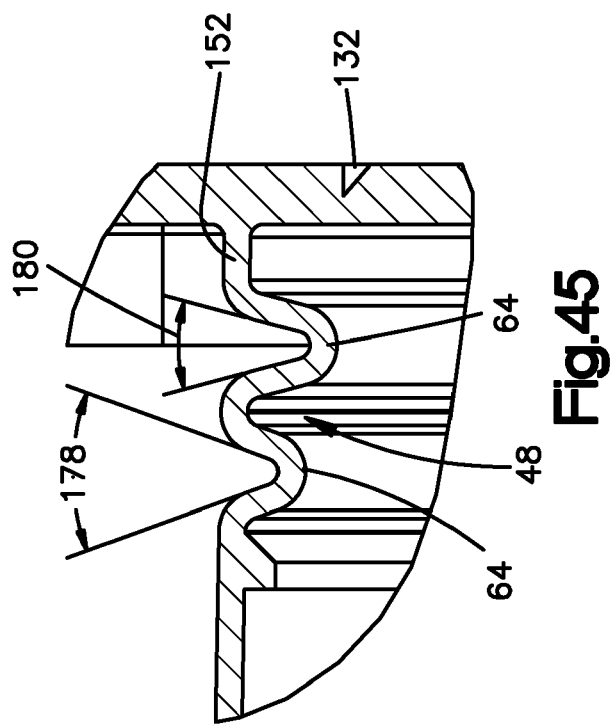
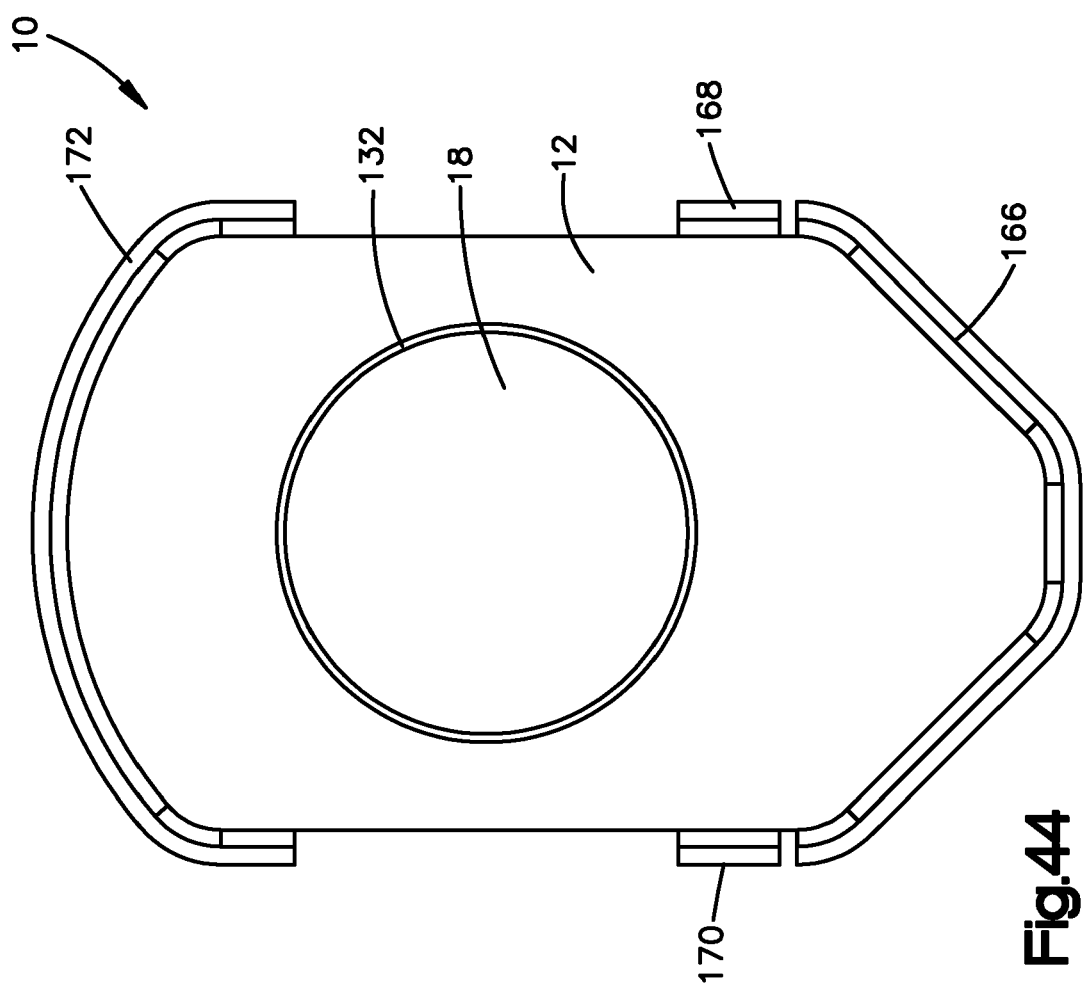

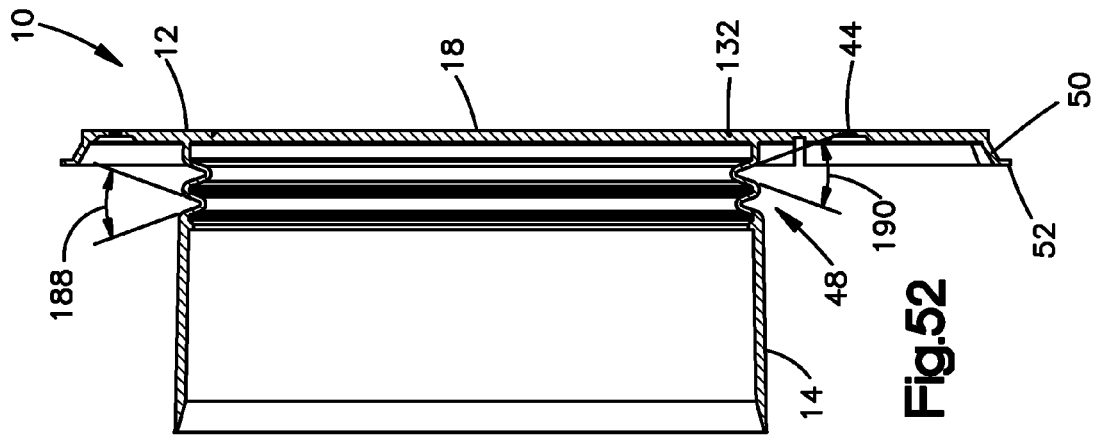
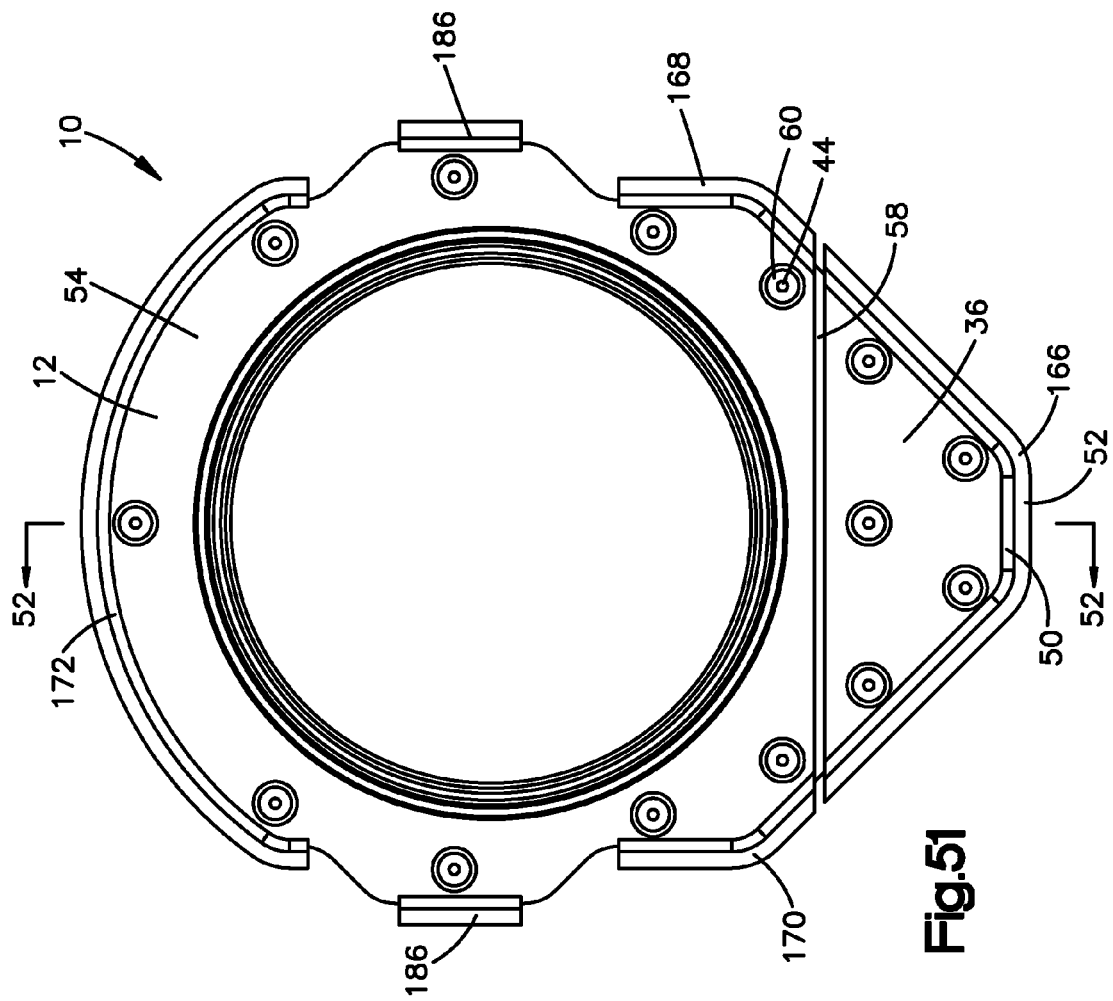

CONDUIT SLEEVE PASS THROUGH FOR CONCRETE CONSTRUCTION

CROSS-REFERENCE TO RELATED APPLICATION

This application claims priority to U.S. Provisional Application No. 60/953,559, filed Aug. 2, 2007, the disclosure of which is incorporated herein by reference in its entirety.

FIELD

This technology relates to a conduit sleeve for use in concrete construction that provides a pass through within a concrete structure.

BACKGROUND

With concrete construction, concrete is poured between one or more forms to define various surfaces of the structure. For example, a vertical concrete wall is formed between two spaced-apart vertically arranged forms. It is common to provide pass throughs through the concrete walls or formations in order to run wires, plumbing, gas lines and the like.

Current methods for forming pass throughs within concrete structures are not reliable and can become easily dislodged during the concrete pour. If this happens, and a pass through is required, the concrete must be core drilled. Core drilling can create liability issues if there are pretension cables installed in the concrete. If the pre-tension cables are damaged or destroyed during drilling, the structural integrity of the structure can be compromised. If the installer chooses not to drill through the concrete, labor and material costs increase because conduits must be strung around the structure, rather than through it.

Current methods also do not provide a concrete tight seal against the form. This can result in the form filling with concrete, rendering it useless. If the conduit is not filled with concrete, but is not flush against the form, after the form is removed, the conduit opening must be manually searched for, which is timely and expensive.

Link-Seal manufactures several pass through products, including the Link Seal, Century Line, and Cell Cast Disks. The Century-Line provides a standard length of 16 inches and consists of three components—two end caps and a sleeve. The end caps can be easily removed and lost after the forms are removed. The Link Seal product is a modular system intended to seal around the conduit and the sleeve it is seated in. Cell Cast Disks are intended to create an opening in the concrete. The disks are removed once the form is removed, leaving a hole.

High Industries manufactures a product called Double Tee Stem Block Outs, which are high cast block outs that are used in pre-cast structures and are not offered for on-site pours. The block outs are available only in specified lengths and are not sealed once the forms are removed. This allows birds, insects and animals to enter the pass through. The high cast block outs are press fit into place and may not be concrete tight. They have only one cross-sectional size.

Cooper B-Line manufactures a pipe sleeve fastener that does not provide a concrete tight seal around the conduit. They can become easily detached during the concrete pour with an expected failure rate of 20%. It is difficult to attach the Cooper parts if the form is not vertical. In addition, the Cooper parts require that each piece of conduit be cut to an exact length, which increases labor if there are variations in the form width.

SUMMARY

An example conduit sleeve is described and claimed.

BRIEF DESCRIPTION OF THE DRAWING FIGURES

FIG. 17 is a cross-sectional side view of the example conduit sleeve of FIG. 15;

FIG. 18 is an exploded view of a portion of the example conduit sleeve of FIG. 17, taken at section 18;

FIG. 42 is a front view of the example conduit sleeve of FIG. 41;

FIG. 43 is a cross-sectional side view of the example conduit sleeve, taken at line 43-43 of FIG. 42;

FIG. 44 is a rear view of the example conduit sleeve of FIG. 41;

FIG. 45 is an exploded cross-sectional view of section B of FIG. 43;

FIG. 51 is a front view of the example conduit sleeve of FIG. 50;

FIG. 52 is a cross-sectional side view of the example conduit sleeve, taken at line 52-52 of FIG. 51.

DETAILED DESCRIPTION

Figure 1:
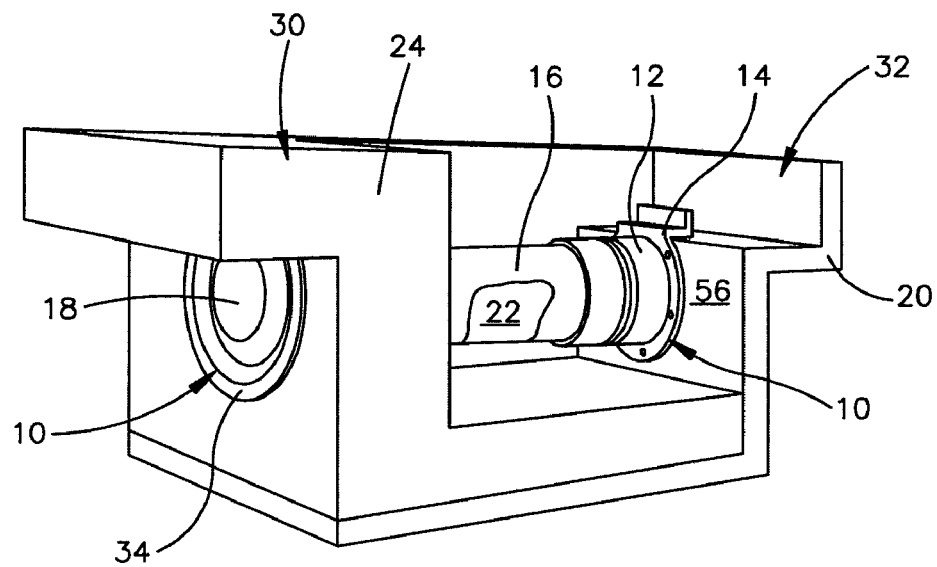
FIG. 1 is a perspective side view of an example conduit sleeve installed in a concrete form.

The example conduit sleeve 10 includes a sleeve-like tubular member 12 that is coupled to a flange 14. The flange 14 can be plate-like. The sleeve-like tubular member 12 is coupled to and fits over the end of a piece of conduit 16 at the front end of the tubular member 12 and is connected to the flange 14 at the rearward end. The conduit sleeve 10 in combination with the conduit 16 creates a passageway 22 through the concrete structure 26. The front face of the flange 14 is coupled to the tubular member 12 and the rear face of the flange 14 is connected to a concrete form 20. The flange 14 is sealed, but has a central portion 18 that can be cut open or knocked out in order to open the conduit sleeve 10 to gain access to the attached conduit 16 and the passageway 22. The example conduit sleeve 10 is installed on a concrete form 20 prior to the concrete 24 being poured in order to provide a pass through 22 after the concrete 24 is poured. Once the concrete 24 has set, the form 20 is removed, leaving the conduit sleeve 10 and conduit 16 embedded in the concrete 24. This creates a potential pass through 22 within the concrete structure 26 without affecting the integrity of the concrete structure 26. The end user can come back at a later date, open the end 18 of the conduit sleeve 10 and run smaller diameter conduit, pipe, or wires through the sleeve 10 and conduit 16, as needed.

Because the end of the conduit sleeve 10 is sealed, this prevents insects, animals, or birds from invading the pass through 22 prior to it being used. One application for this technology is parking lot structures. A typical application will be a vertical pillar or wall 26 of a parking lot or other structure. The pass through 22 may also be provided through a horizontal or vertical beam, among other applications. The invention is not limited to a particular application. It can be used in any concrete structure to create a horizontal or vertical pass through 22, including any type of building.

The example conduit sleeve 10 provides a concrete tight seal around the conduit 16 and can be quickly and securely fastened to the form 20. The conduit sleeve flange 14 abuts the form 20 such that after the concrete 24 is poured and the form 20 is removed, the flange 14 is visible on the wall 26 of the concrete structure. This ensures that the conduit sleeve 10 is easily seen and can be used when needed. The conduit sleeve 10 is preferably manufactured from a flexible material, such as a thermoplastic elastomer. The conduit sleeve 10 can be manufactured from an engineered rubber (EPDM). EPDM is easily cut to open the central portion 18 of the flange 14. One type of thermoplastic elastomer is polyethylene, such as high density polyethylene. Harder plastics may also be used, but would not provide the same amount of flexibility. By using a flexible material in combination with the overall design, the parts are flexible enough to be used with forms 20 ranging from horizontal to vertical while still allowing the conduit pass through 22 to remain horizontal and level. Also, since the pass through 22 is often provided through a wall or beam 26 in the vicinity of the ceiling 28 of the concrete structure, the conduit sleeves 10 can be mounted in such a way as to keep the pass through 22 even with the edge of the adjacent ceiling 28 once the form 20 is removed. The conduit sleeve 10 provides a cost-effective means for contractors to install pass through systems for electrical, plumbing, fire systems, or any other conduit products in the walls, columns, or beams prior to the concrete pour.

The example conduit sleeve 10 can be used with a conventional conduit 16 that is cut to length by the end user. The flexible design allows for usage with Schedule 40 and 80 PVC conduit, GRC, IMC, DWC plumbing pipe, Schedule 40 plumbing pipe, stainless steel and black iron pipe, among other types of conduit. The conduit sleeve 10 is held in place by the concrete 24 after the pour is completed and cannot be removed. The conduit sleeve 10 remains in place and is opened when the sealed central portion 18 of the flange 14 is cut open by the end user. The flange 14 can remain closed, if the user determines that the pass through 22 is not needed.

In some cases, to reduce the overall thickness of the concrete 24 and maintain load bearing structural requirements, the forms 20 are built with a rib section on the under side (not shown). These ribs can be vertical or angled slightly, depending on the structural requirements. The example conduit sleeve 10 is designed to be mounted at the top edge of the rib in the form, and is flexible in nature.

The example conduit sleeves 10 can be used with both on-site pours and pre-cast structures. They are designed to hold a concrete tight seal around the attached conduit 16. They are available in various sizes, so that the smallest size can be used while structural integrity is not compromised. For example, the conduit sleeves 10 could be provided in the following diameters: 2", 3", 4", 6", 8", 10" and 12", among other diameters. The conduit sleeves 10 may be the same color as the concrete, such as grey, or may be a different color from the concrete to make them readily noticeable. Advantageously, since multiple sizes are provided, no off-site prefabrication is required. The contractor can simply select the size of conduit 16 and conduit sleeve 10 and cut the conduit 16 to the desired length.

The example conduit sleeve 10 provides labor savings and eliminates off site and on site prefabrication. It provides consistency in pass through locations from ceiling and center to center. No taping and no clips are required. It is corrosion resistant and aesthetically pleasing after the forms 20 are removed.

Referring to the Figures, FIGS. 1-4 depict examples where two conduit sleeves 10 are attached to a concrete form 20 at either end of a wall or beam 26, with a cut-to-length conduit 16 installed between the two sleeves 10. As is evident, two conduit sleeves 10 are typically used together, with the sleeve-like tubular members 12 of the conduit sleeves 10 facing one another and with a conduit 16 installed in the open ends of the tubular members 12.

Figure 2:
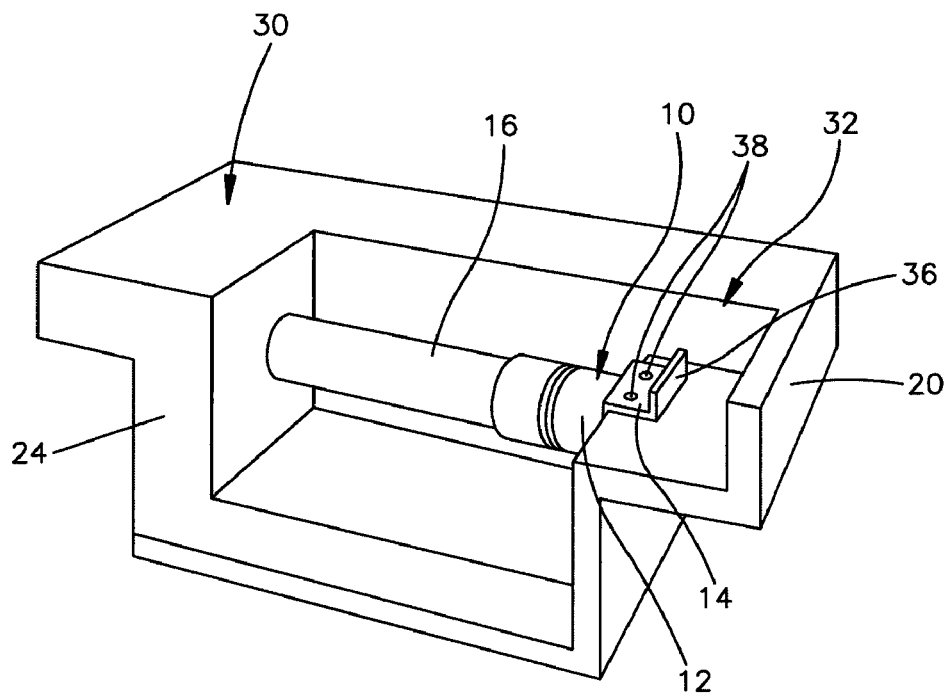
FIG. 2 is a perspective top view of the example conduit sleeve of FIG. 1.

FIGS. 1 and 2 depict a cut-away concrete structure showing how the conduit sleeves 10 and conduit 16 are installed on a concrete form 20. The left side 30 of the concrete structure shows the conduit sleeve 10 installed in the concrete 24 after the form 20 has been removed, with the concrete 24 formed around the conduit sleeve 10 and the right side 32 of the concrete structure shows the concrete form 20 in place and the conduit sleeve 10 installed on the form 20 prior to concrete being poured into the form 20. Once concrete 24 is poured, the entire conduit 16 and conduit sleeve 10 will be covered by the concrete 24 and the conduit 16 and conduit sleeve 10 will permanently remain positioned inside the concrete structure.

As shown in FIG. 1, the rear face 34 of the flange 14 of the conduit sleeve 10 remains exposed after the concrete 24 is poured such that a user may easily cut out the central portion 18 of the flange 14 to reveal the interior of the attached conduit 16. In addition, the flange 14 of the example conduit sleeve 10 may be coupled to a concrete form 20 by nailing or otherwise attaching the flange 14 to the form 20. Nails 38, screws and even pop rivets for use with metal pan decks will easily pull through the holes 44 in the flange 14 for easy removal.

FIG. 2 shows how the conduit 16 is encased within the concrete 24 after the concrete is poured. In addition, FIG. 2 shows one example conduit sleeve 10 where a top portion 36 of the flange 14 is folded over the concrete form 20 and attached to the form 20 with nails 38 to hold it in place.

Figure 3:
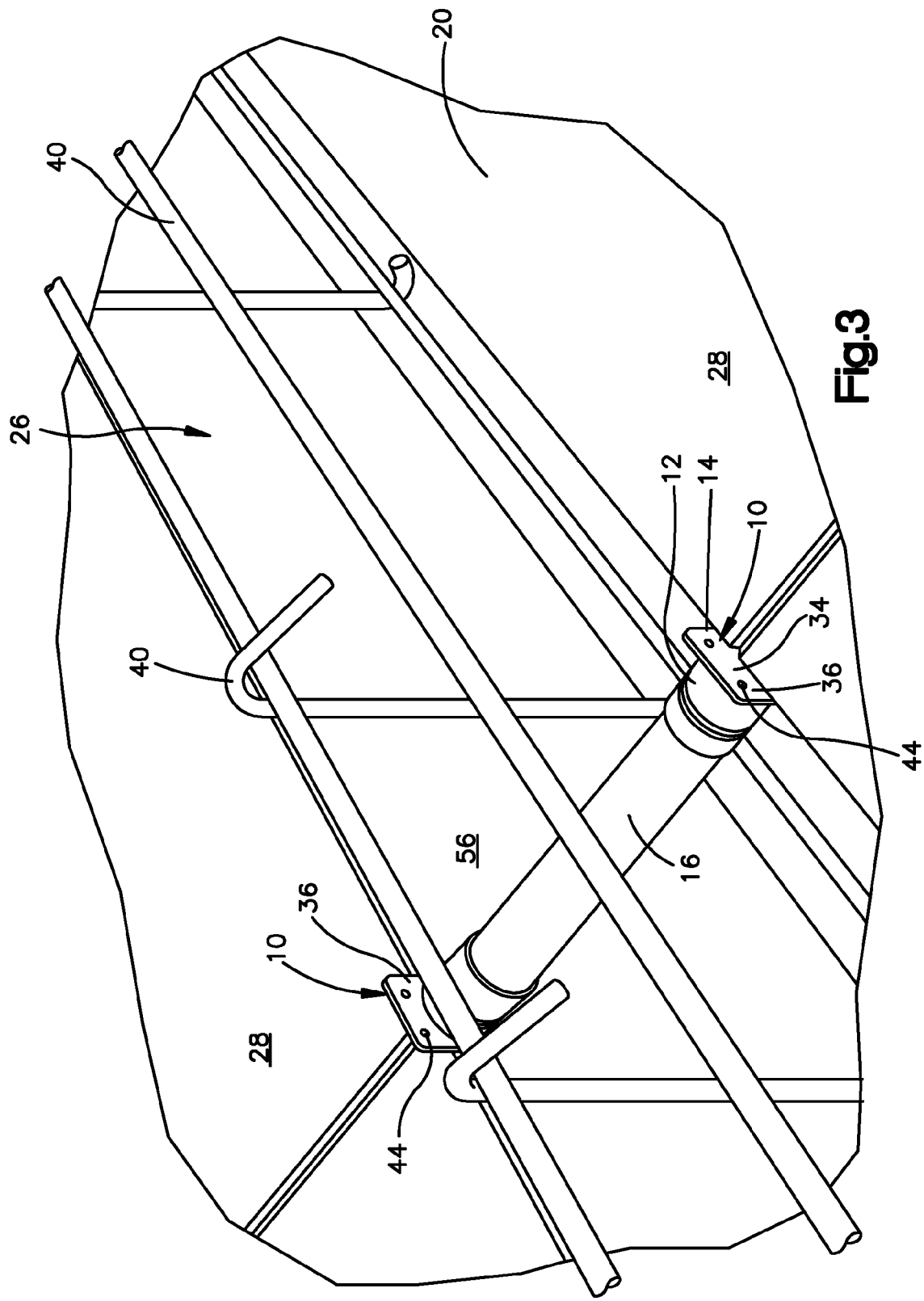
FIG. 3 is a view of a conduit sleeve in a concrete structure prior to final installation and concrete pour.
Figure 4:
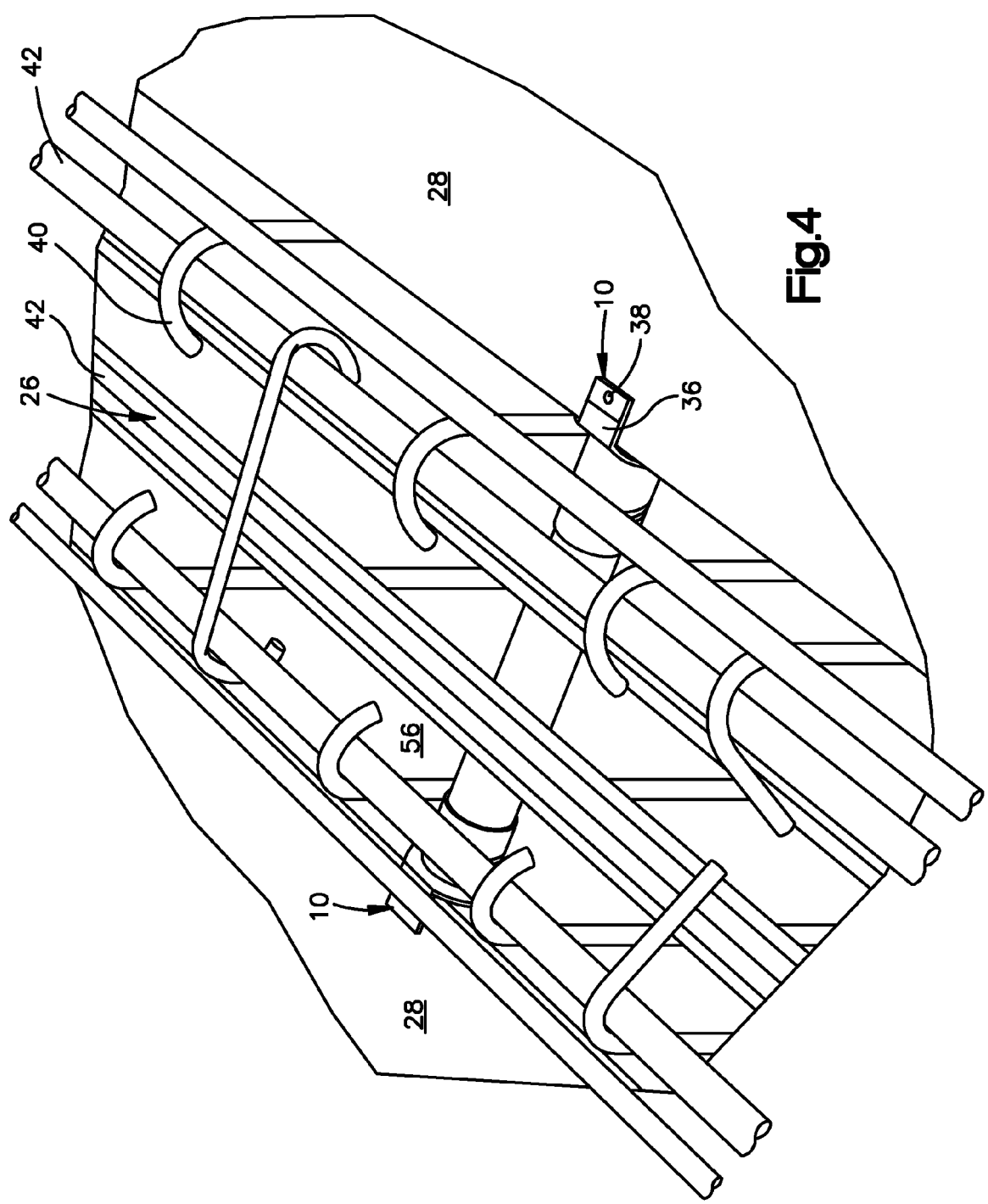
FIG. 4 is a view similar to FIG. 3, but with the conduit sleeve in an installed position prior to concrete pour.

FIGS. 3 and 4 depict a pass through 22 being installed at the ceiling level 28 of a concrete structure. The wooden form 20 is installed and the conduit sleeve 10 and conduit 16 are installed to cross a beam or vertical wall 26 of the concrete structure. In this example, the central portion 18 of the conduit sleeve 10 is aligned with the bottom of the adjacent ceiling 28. When the form 20 is removed, the pass through 22 will be adjacent the ceiling 28 of the concrete structure. Rebar 40 and tension cables 42 are shown positioned in the beam or vertical wall 26 and will remain in the wall after the concrete 24 is poured. The top portion 36 of the flange 14 is folded over the surface of the form 20 in order to firmly hold the conduit sleeve 10 and associated conduit 16 in position during the concrete pour. In addition, the flange 14 of the conduit sleeve 10 may be nailed to the vertical surface of the form 20 via nail holes 44 that are provided through the flange 14.

FIGS. 5-8 depict an example conduit sleeve 10 that has a flange 14 and a tubular member 12. In a resting position, the tubular member 12 has a longitudinal axis X-X that is perpendicular to the plane of the flange 14. The tubular member 12 includes an outwardly flaring lip 46 in order to allow easy entry of a conduit 16 into the tubular member 12. The lip 46 allows the conduit 16 to easily enter the tubular member 12 until a friction fit is created. The friction fit ensures that concrete 24 will not leak into the interior of the conduit 16 or conduit sleeve 10 during the concrete pour.

Figure 5:
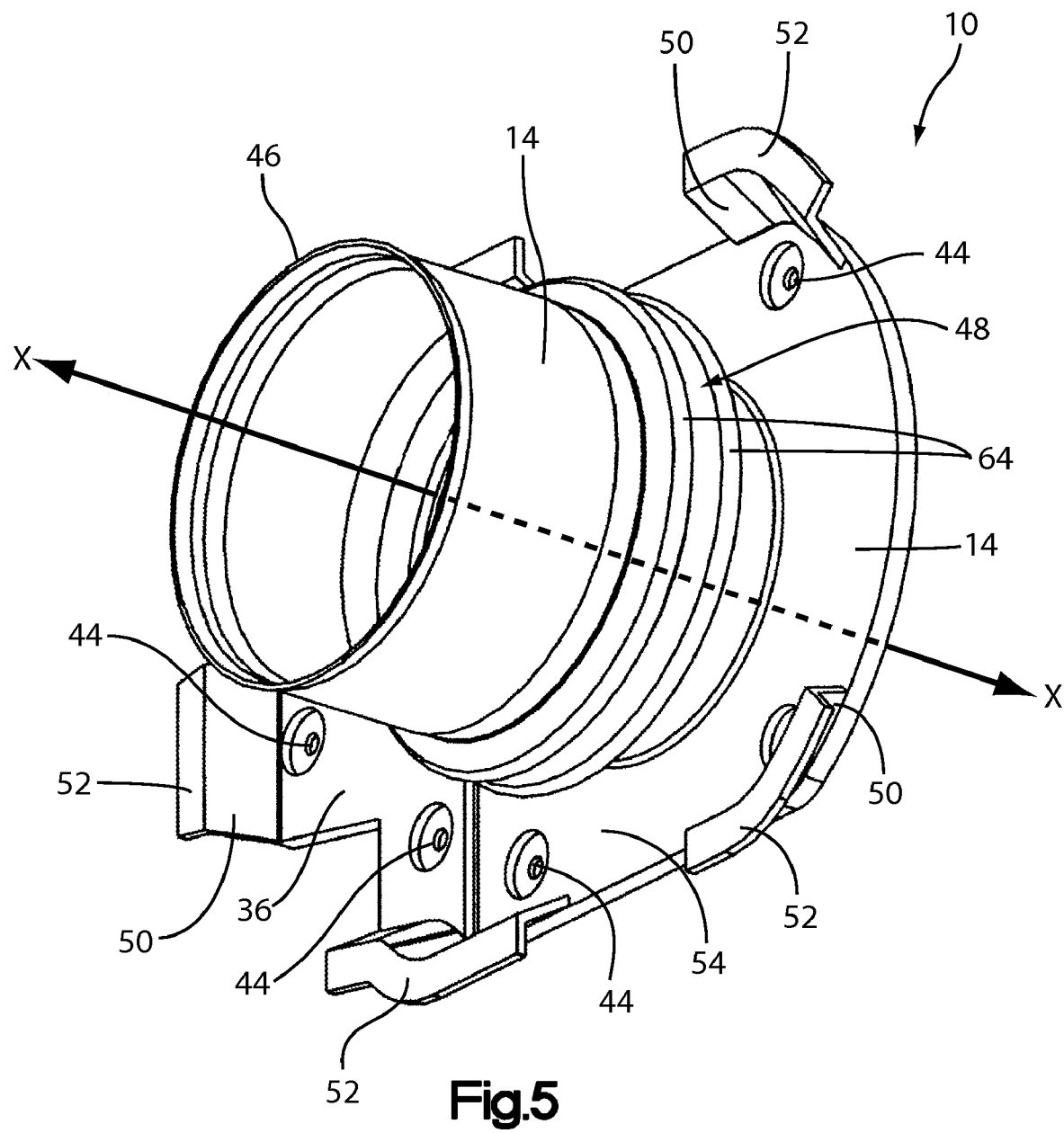
FIG. 5 is a perspective view of an example conduit sleeve.
Figure 6:
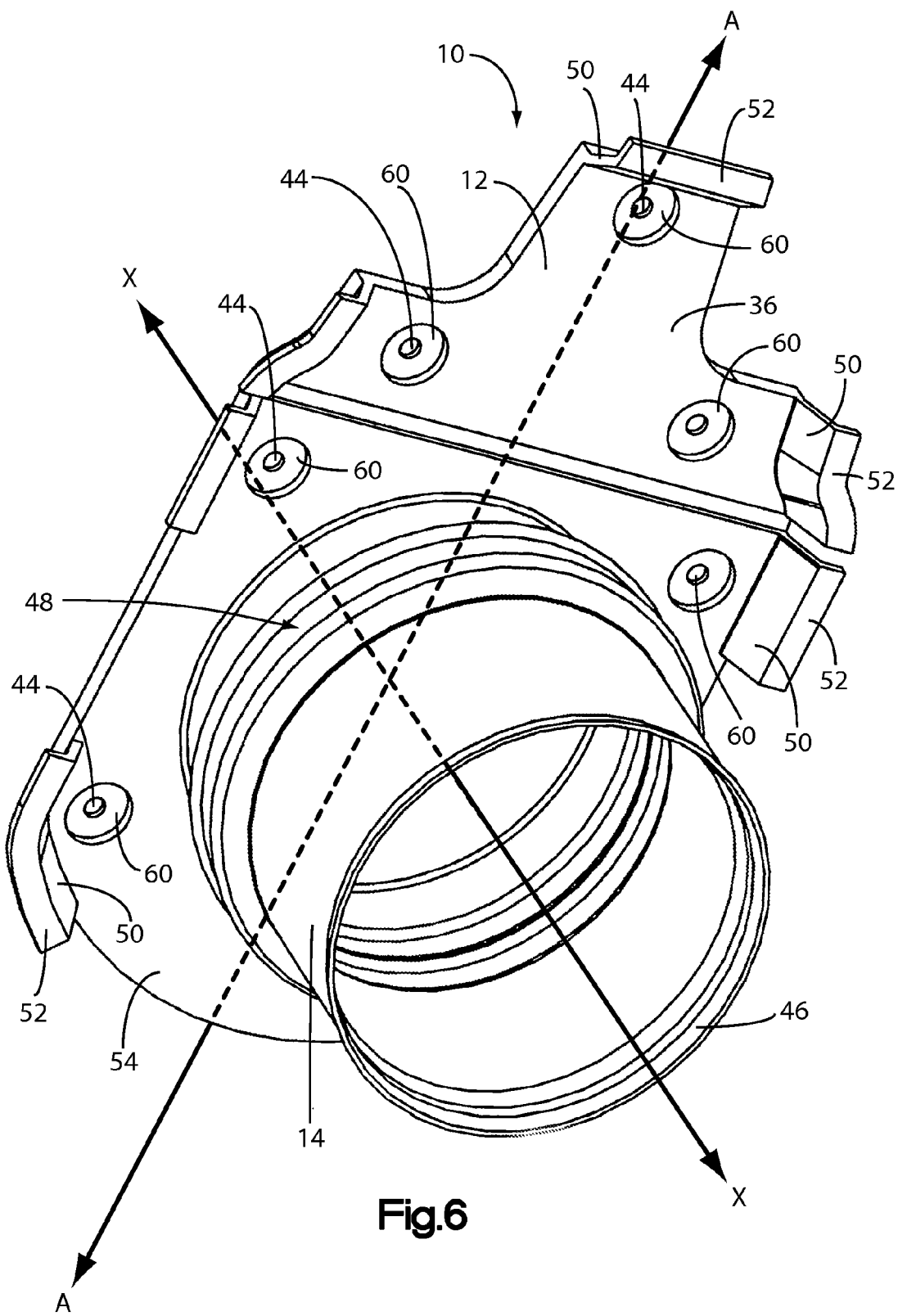
FIG. 6 is another perspective view of the example conduit sleeve of FIG. 5.

The tubular member 12 includes an accordion or bellows, pleated section 48 that allows the tubular member 12 to be angled at an angle other than 90 degrees relative to the flange 14. For example, the bellows 48 may allow the conduit sleeve 10 to be installed on a surface that is angled 30 degrees relative to a horizontal surface. In this section, the flange 14 is a plate-like member that has outwardly extending tabs 50. The tabs 50 include fingers 52 that are angled relative to the tabs 50. The tabs 50 and fingers 52 help to assist in maintaining the conduit sleeve 10 inside the concrete 24 after the concrete has hardened and so that the flexible material of the conduit sleeve 10 does not separate from the concrete 24. The flange 14 has a top portion 36 and a bottom portion 54. The top portion 36 is typically at the end that can be folded over a concrete form 20 and the bottom portion 54 is typically the portion that seats against the vertical wall of the concrete form 20. In order to facilitate the folding over of part of the flange 14, the flange 14 may have a thinned portion 58, as shown in FIGS. 5 and 6.

The flange 14 also includes a series of holes 44 that can be used to secure the conduit sleeve 10 to the concrete form 20. The holes 44 include a recessed portion 60 that surrounds each hole 44 in order to provide a thinner plastic portion so that any nails 44 that are installed through the flange 14 into the form 20 are easily removed from the flange 14 when the form 20 is removed. The nails 44 remain in the form 20. A rear side 34 of the flange 14 is preferably relatively flat, in order to allow the flange 14 to seat against a concrete form 20. However, as shown in the conduit sleeve 10 discussed above in FIGS. 1 and 2, and in some of the conduit sleeves 10 discussed below, there may be some indentations or bellows 62 formed on the rear face 34 of the flange 14 in the location of the central portion 18, which is the portion that can be removed in order to gain access to the pass through conduit 16. Tabs 50 are shown extending forwardly from the flange 14 at an angle. An angle of approximately 90 degrees could be used, as could an angle of about +/−30 degrees relative to the 90 degree position. Other angles could also be used for the tabs 50. The tabs 50 also include a lip or finger 52. The lips 52 may be angled at a 90 degree or other angle 144 relative to the plane of the tabs 50. The lip 52 can be parallel to the flange 14, if desired, and can extend either inwardly or outwardly.

The bellows structure 48, 62 on the tubular member 12 can have one or more pleats 64. As shown, the bellows 48 has two pleats 64 that extend outwardly from the surface of the tubular member 12. In the example of FIGS. 5 and 6, the flange 14 includes a total of seven through holes 44. Four of the holes are positioned in the bottom portion 54 of the flange 14 and substantially surround the tubular member 12. Three of the holes 44 are positioned in the top portion 36 of the flange 14. Two are positioned near the fold line 58 and one is positioned at the top end of the top portion 36. The top portion 36 of the flange 14 is cut away into a smaller tab portion. This can save in material costs since a wider flange 14 is not required at the top end.

Figure 8:
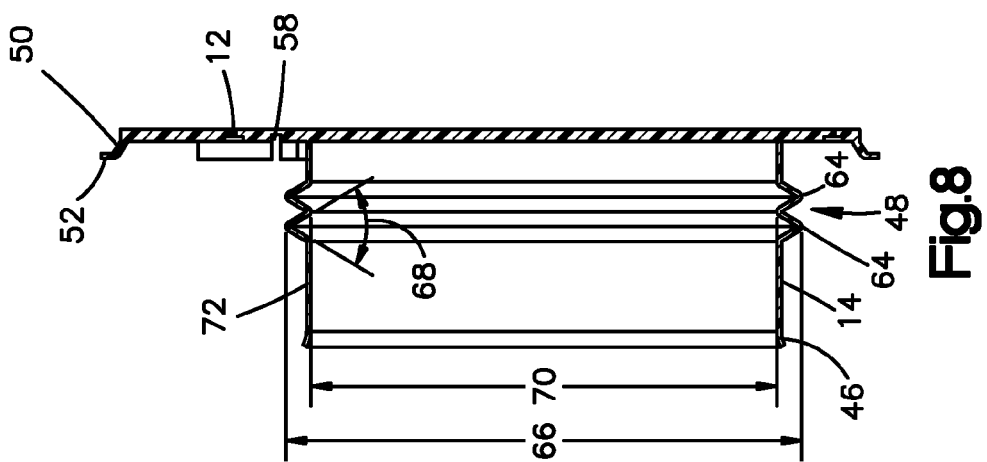
FIG. 8 is a cross-sectional side view of the conduit sleeve of FIG. 7, taken at line 8-8.
Figure 7:
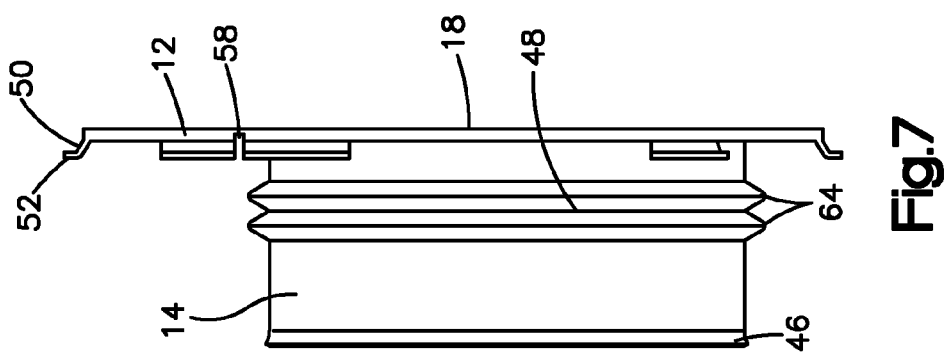
FIG. 7 is a side view of a conduit sleeve similar to that of FIG. 6.

FIGS. 7 and 8 depict a similar conduit sleeve 10 in a side view thereof. The bellows 48 of the tubular member 12 each have a similar outer diameter 66. Each pleat 64 of the bellows 48 has an angle 68 of about 50 degrees, although other angles may be used depending upon how much rotation or angling of the tubular member 12 is needed relative to the flange 14. In addition, the inner diameter 70 of the pleats 64 has a similar inner diameter to the inner diameter of the tubular member 12. The pleats 64 are positioned at an intermediate portion 72 of the tubular member 12, in the vicinity of the flange 14. An inner tubular portion 74 is positioned between the pleats and the flange 14. The rear side 34 of the flange 14, at the central portion 18, is sealed by the plastic of the flange 14. The user can cut the plastic away in order to reveal the pass through 22.

Figure 9:
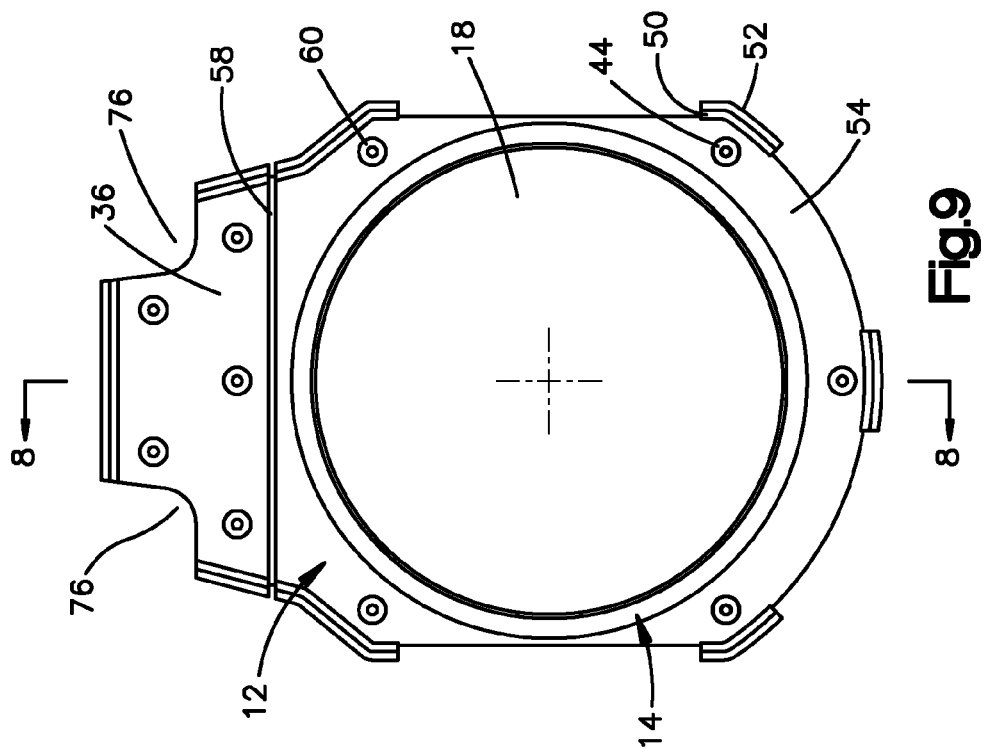
FIG. 9 is a front view of another example conduit sleeve.

FIG. 9 depicts an example conduit sleeve 10 similar to that of FIGS. 5 and 6, except for the conduit sleeve tubular member 12 does not include bellows. In addition, more connecting holes 44 are used to secure the flange 14 to a concrete form 20. This example conduit sleeve 10 could be used for a larger diameter pass through 22 than the example shown in FIGS. 5 and 6. In this example, five holes are positioned around the central portion 18 in the bottom part 54 of the flange 14 and five holes 44 are positioned in the top portion 36 of the flange 14, above the fold line 58. Three of the five holes are positioned directly above the fold line 58 and two of the holes are positioned at an upper end of the top portion 36. The top portion 36 includes cut away corners 76 near the top end of the flange 14. This can save in material costs since a wider top end of the top portion 36 is not needed in order to effectively secure the conduit sleeve 10 to a concrete form 20. Outwardly extending tabs 50, similar to those discussed above, are also provided on the flange 14.

Figure 11:
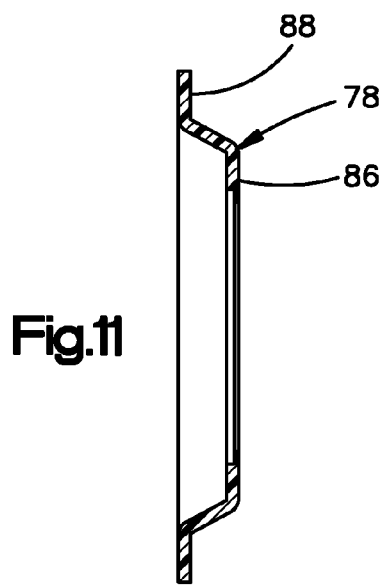
FIG. 11 is a cross-sectional side view of the flange shown in FIG. 10.
Figure 10:
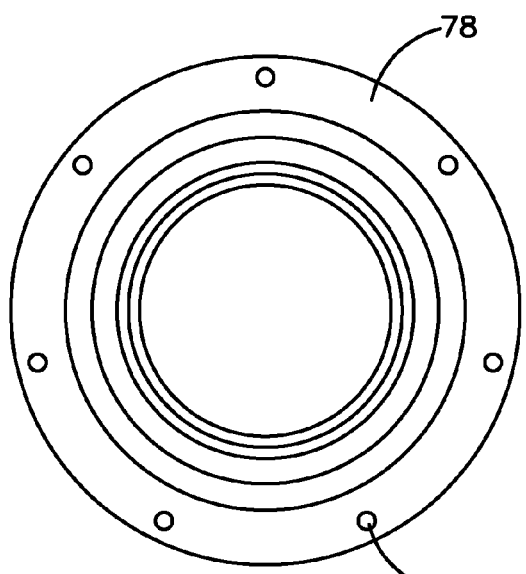
FIG. 10 is an end view of a flange used in connection with an example conduit sleeve system.
Figure 12:
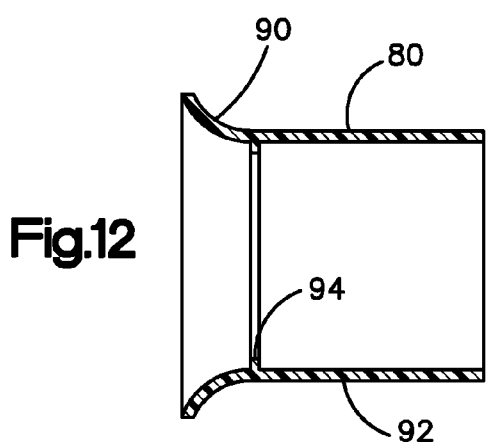
FIG. 12 is a cross-sectional side view of an example tubular member for use with the flange of FIG. 10.
Figure 14:
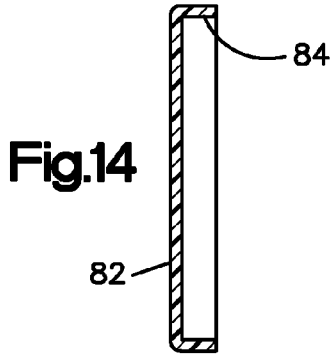
FIG. 14 is cross-sectional side view of the end cap alone.
Figure 13:
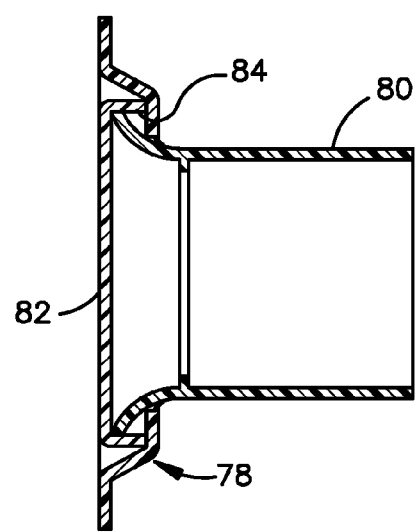
FIG. 13 is a cross-sectional side view of the conduit sleeve system incorporating the tubular member of FIG. 12 and the flange of FIG. 10, along with a removable end cap.
Figure 15:
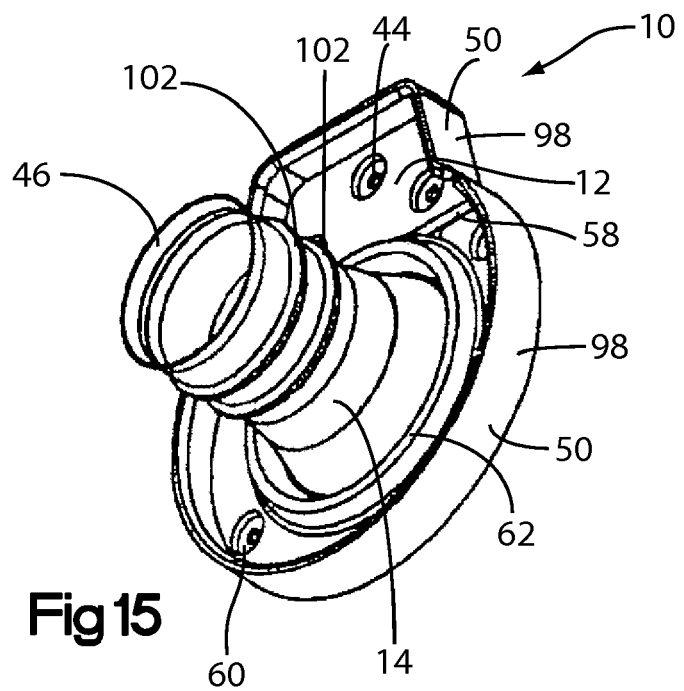
FIG. 15 is a perspective view of another example conduit sleeve.
Figure 16:
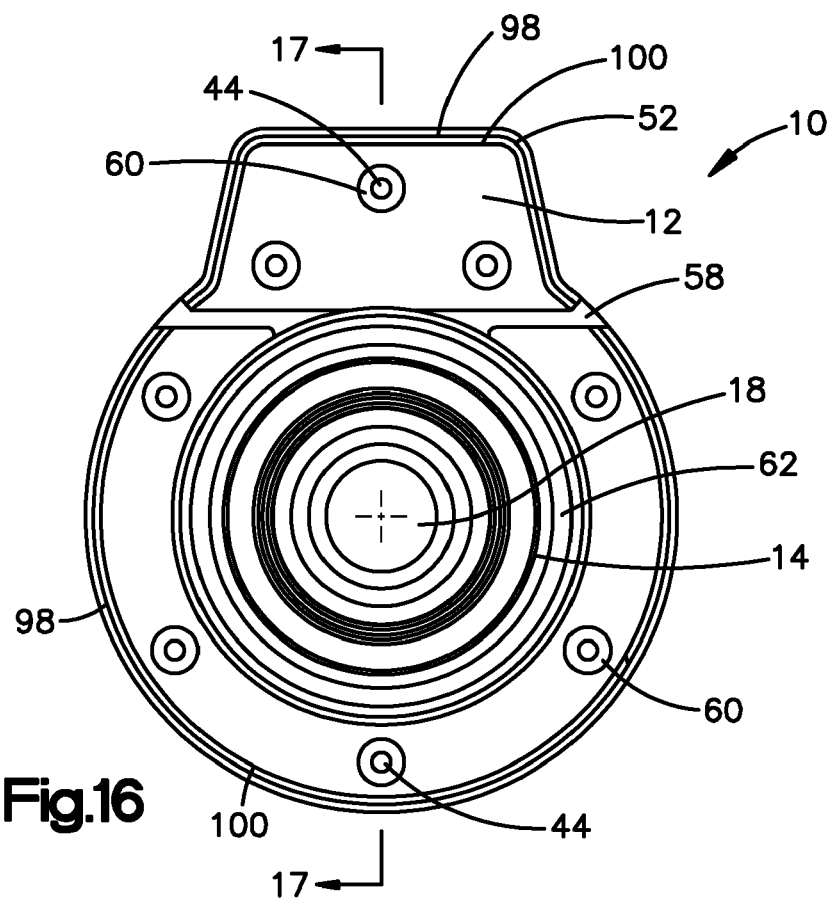
FIG. 16 is a front view of the conduit sleeve of FIG. 15.

FIGS. 10-14 depict an alternative example conduit sleeve system. With this example, multiple parts are used in order to provide an angled installation. A ring-like flange 78 structure, shown in FIGS. 10 and 11, is used with a tubular member 80, shown in FIG. 12, and an end cap 82, shown in FIG. 14. The end cap 82 is round and includes a lip 84 for seating around the outside of the tubular member 80 to seal the end thereof. The flange structure 78 includes a recessed inner portion 86 and an outer portion 88 that seats against a concrete form 20. The inner portion 86 flares out from the outer portion 88 of the flange 78. A plurality of holes 44 are positioned around the outer portion 88 of the flange 78. The holes 44 are used to couple the outer portion 88 of the flange 78 to a form 20. In addition, the flange 78 has a fold line 58 that allows the top portion 36 to be bent over and secured to the form 20. The tubular member 80 includes a flared end 90 that is coupled to a substantially cylindrical body portion 92. A stop 94 is spaced from the flared end 90 and is used to stop a conduit 16, when inserted into the cylindrical body portion 92, from extending into the flared portion 90. The flared end 90 allows the tubular member 12 to be angled relative to the flange 78, thereby allowing for angled installations of a conduit 16 in a structure. The end cap 82 is designed to stay in position during the concrete pour. In addition, the tubular member 80 provides a tight fit with the flange 78 in order to prevent the egress of concrete 24 into the flange 78 or tubular member 80.

FIGS. 15-18 depict an alternative example conduit sleeve 10. In this example, a flange 14 is coupled to a tubular member 12. The flange 14 has a flared lip 46, as discussed above with a prior example. The inner surface 96 of the tubular member 12 tapers slightly from the flared opening 46 to a position inside the tubular member 12. This taper helps to create a friction fit with a conduit 16 as the conduit is slid into the tubular member 12. In addition, because of the taper, there will come a point where the conduit can no longer be inserted, thereby serving as a stop for the conduit 16. In addition, the flange 14 has a top portion 36 that extends above a thinned portion 58 of the flange 14, which is located directly adjacent the tubular member 12 at the top end thereof. The top portion 36 of the flange 14 has three holes 44 for coupling to a concrete form 20. The bottom part 54 of the flange 14, which is positioned below the fold line/thinned portion 58, includes five holes 44 that are spaced around the periphery of the tubular member 12. Each of the holes 44 includes a recessed portion 60 that allows the nails 44 that are hammered into the concrete form 20 to easily break away from the flange 14 when the form 20 is removed. The recessed portions 60 provide a weakened area that makes it easier for the form 20 and nails 38 to be removed from the conduit sleeve 10.

This example includes two continuous tabs 98 that extend perpendicular to the surface of the flange 14. One of the continuous tabs 98 extends around the top portion 36 and the other extends around the bottom portion 54. Each tab 98 includes an inwardly extending lip 100. The continuous tabs 98 and associated lips 100 are used to hold the conduit sleeve 10 inside the concrete 24 after the concrete has hardened.

FIG. 17 depicts a cross-sectional view of the rear surface 34 of the flange 14 and the closed central portion 18. In this example, the central portion 18 includes a bellows portion 62 that comprises a single accordion pleat 64. This pleated section 64 imparts flexibility to the conduit sleeve 10 in order to allow it to be angled relative to the surface of a form 20 such that a conduit 16 can remain horizontal. The central portion 18 can be cut out to open the pass through 22. In addition, the exterior surface of the tubular member 12 includes two cylindrical outwardly extending ribs 102. These ribs 102 are used to hold the conduit sleeve 10 inside the concrete 24.

Figure 20:
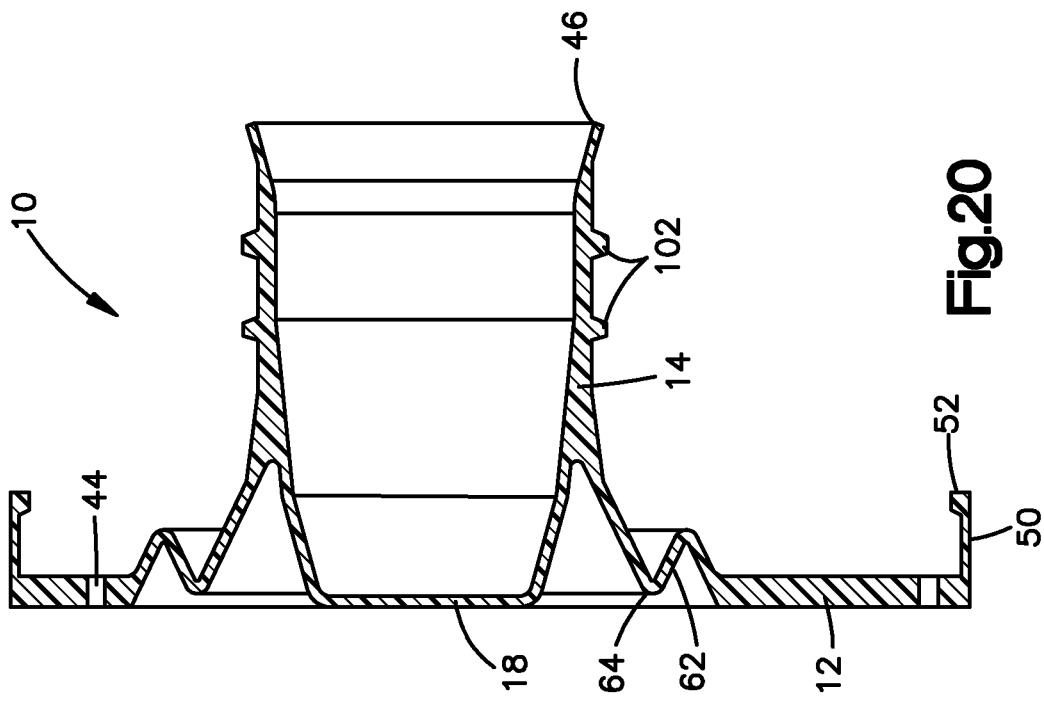
FIG. 20 is a cross-sectional side view of the conduit sleeve of FIG. 19, taken at section 20-20.
Figure 19:
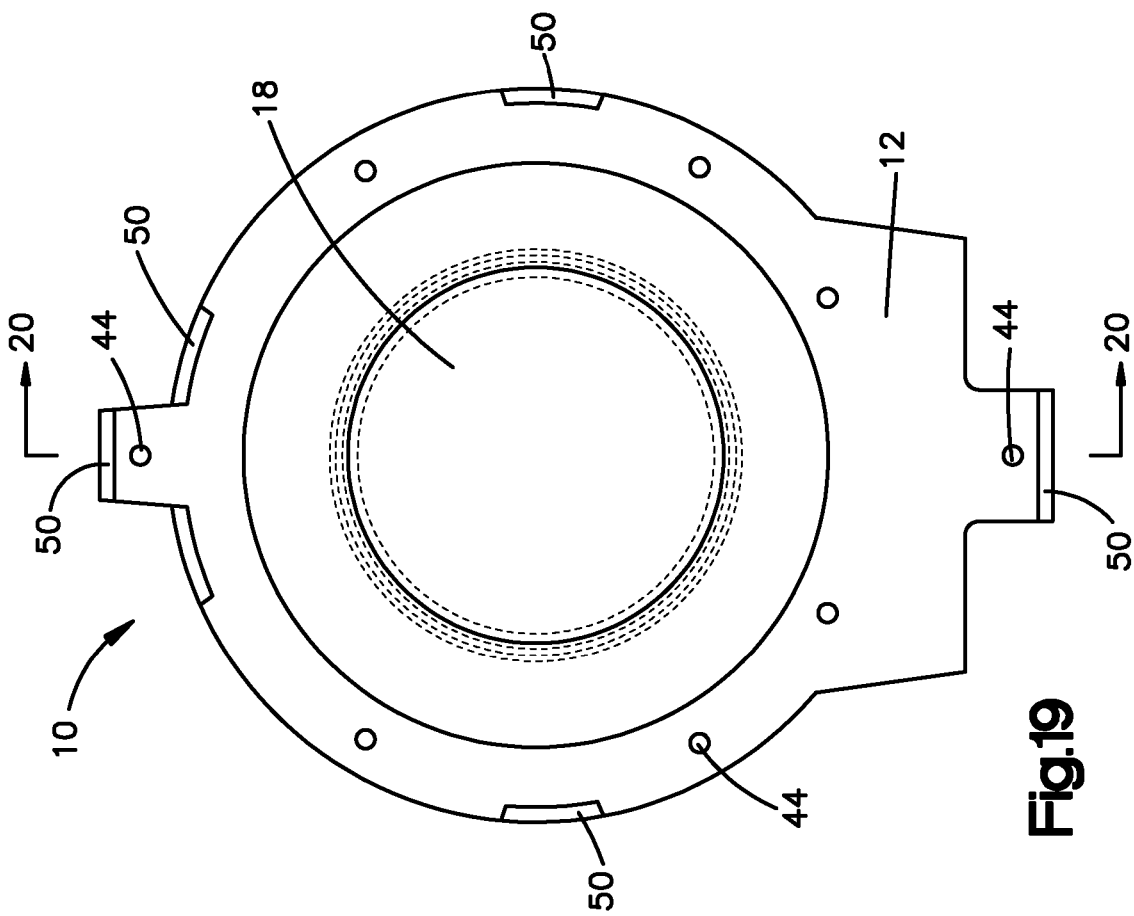
FIG. 19 is a front view of an alternative example conduit sleeve.

FIGS. 19 and 20 depict alternative examples similar to FIGS. 15-18, but with a reduction in the size of the perpendicular tabs 50. In this example, the top portion 36 (shown at the bottom of FIG. 19), has a tab 50 with a lip 52 that extends perpendicular to the tab 50. Perpendicular tabs 50 are also provided on the sides and at the bottom of the flange 14 (shown at the top of FIG. 19). FIG. 19 depicts the flange 14 from a rear side 34 thereof, which is the side that seats against a form 20. The tabs 50 have inwardly extending lips 52 in order to better secure the conduit sleeve 10 inside the concrete 24 once the concrete is poured. In addition, as with prior examples, a relief section 58 is provided between the top portion 36 and the bottom portion 54 of the flange 14, and is positioned at the top of the tubular member 12.

Figure 21:
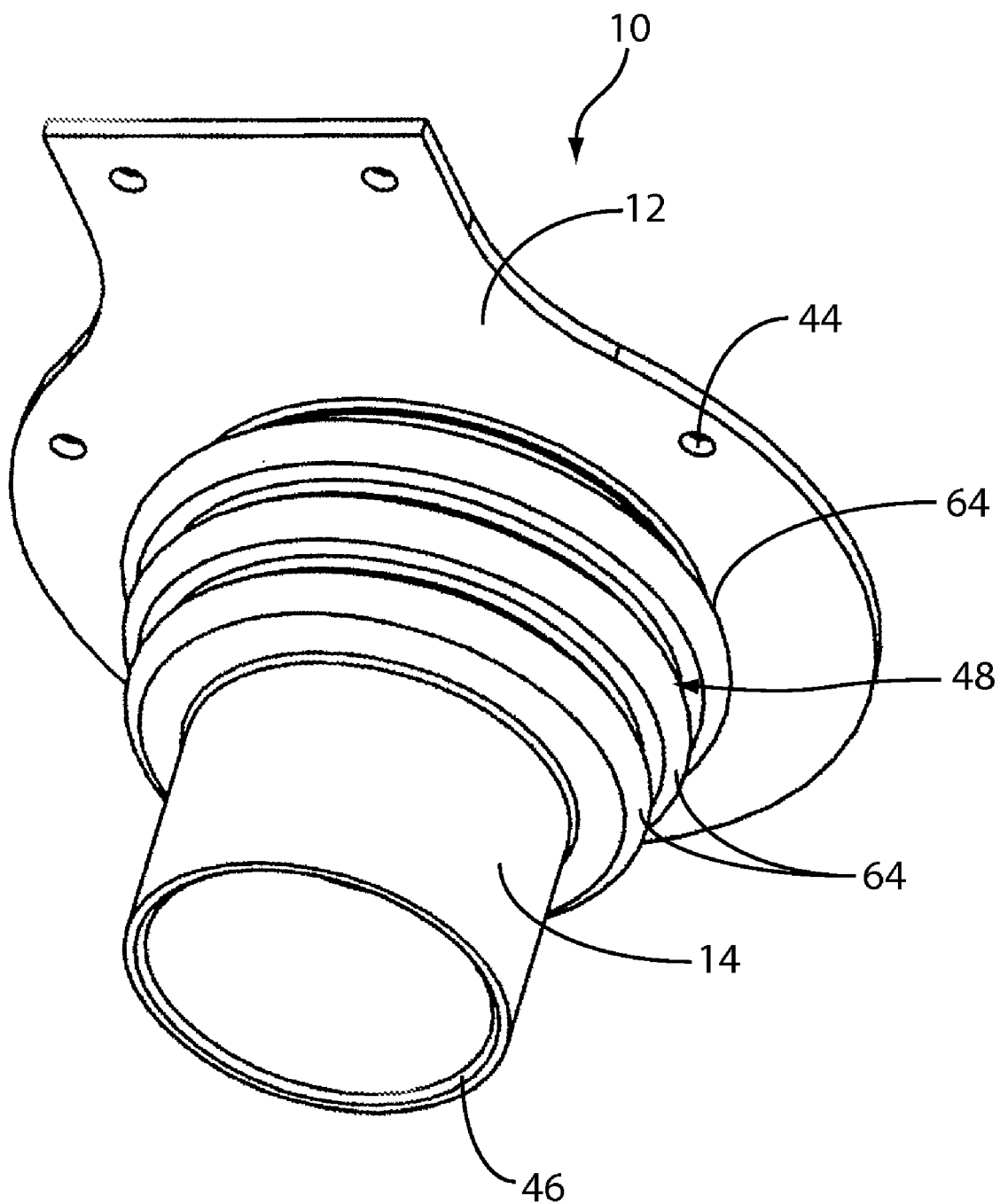
FIG. 21 is a perspective view of an alternative example conduit sleeve.
Figure 22:
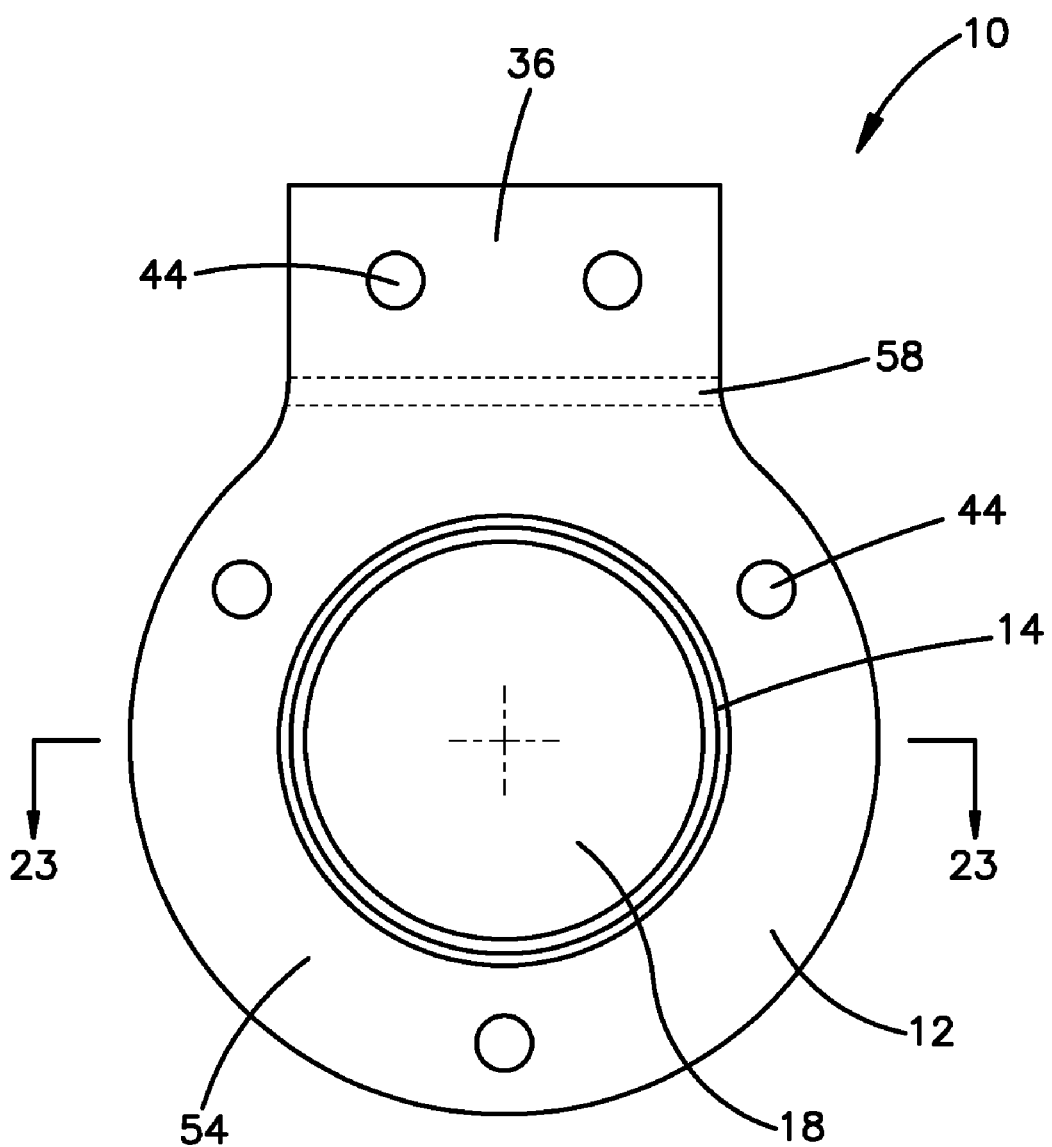
FIG. 22 is a front view of the conduit sleeve of FIG. 21.
Figure 23:
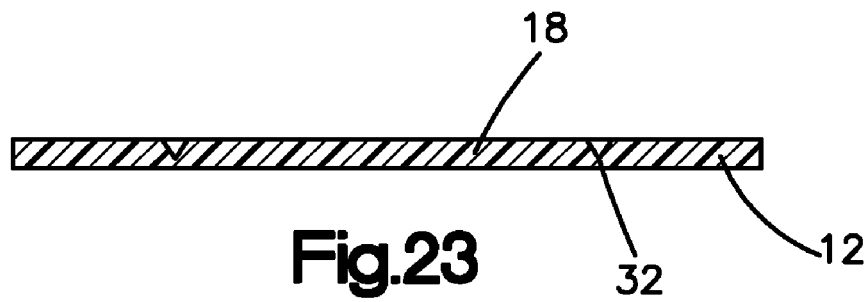
FIG. 23 is a cross-sectional side view of the conduit sleeve of FIG. 22, taken at section 23-23.

FIGS. 21-23 represent an alternative example of the conduit sleeve 10, which includes a tubular member 12 and a flange 14. In this example, the flange 14 is round in the bottom portion 54 and is a tab shaped in the top portion 36. The tab includes two holes 44 for coupling the flange 14 to a concrete form 20. In addition, four holes 44 are positioned around the bottom portion 54 of the flange 14 for coupling the bottom portion 54 of the flange 14 to a concrete form 20. The tubular member 12 includes a flared opening 46 that assists in providing a friction fit with an adjoining conduit 16. The tubular member 12 includes three bellows or pleats 64 that are used to angle the tubular member 12 relative to the flange 14. A fold line 58 is provided on the rear surface 34 of the flange 14 in order to allow the tab 36 to be folded over a concrete form 20. The bellows pleats 64 have diameters that vary from a smaller diameter 108 to a larger diameter 104 as they progress toward the flange 14, with the greatest diameter pleat 104 being positioned adjacent the flange 14, but spaced therefrom in order to provide for greater flexibility and the smallest diameter pleat 108 being positioned closest to the flared opening 46. The bellows pleats 64 could all be of the same inner and outer diameter, or could all be different diameters, both inner and outer. As shown in FIG. 23, the central portion 18 of the rear side of the flange 14 includes a thinned portion 106 that encircles the central portion 18. This thinned portion 106 makes it easier to break out the central portion 18 to reveal the interior of the sleeve 10 and the pass through 22. Other types of thinning or cuts in the surface could be utilized. Molded in indentations could be used to demarcate the central portion 18. Any known method for marking the location of the central portion 18 and for facilitating the removal of the central portion 18 may be utilized. As shown in FIG. 22, the flange 14 includes five through holes 44 for coupling the flange 14 to the concrete form 20. Two holes are positioned above the thinned section 58 and three holes are spaced around the central portion 18.

Figure 24:
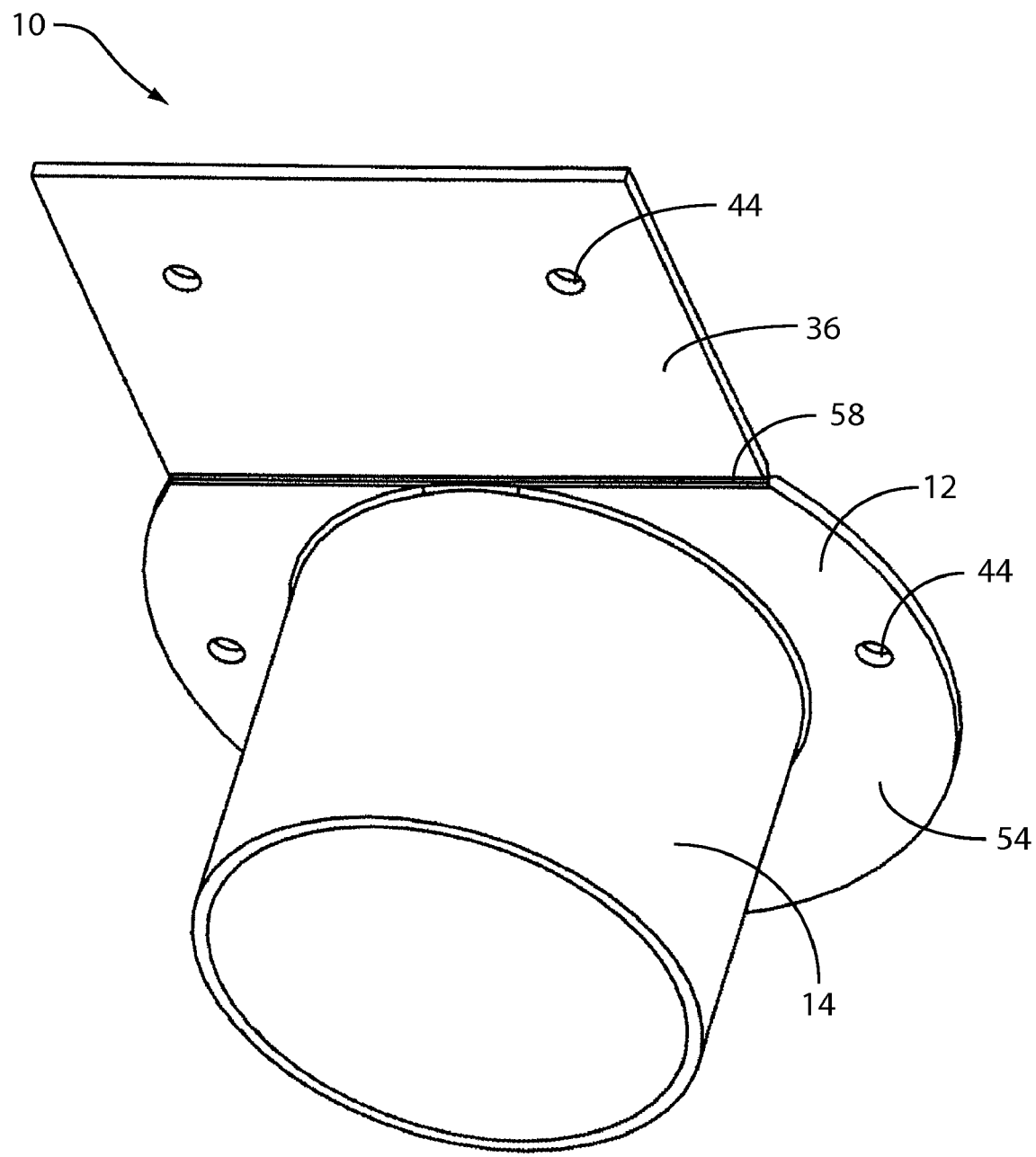
FIG. 24 is a front perspective view of yet another example conduit sleeve.

FIGS. 24-27 represent an alternative example conduit sleeve 10 that utilizes a foam backer 110 in order to adjust the angle of the tubular member 12 relative to the form 20. As shown in FIG. 24, the conduit sleeve 10 includes a flange 14 and a tubular member 12. The tubular member 12 extends at a 90 degree angle relative to the plane of the flange 14. The flange 14 has a circular bottom portion 54 that encircles the tubular member 12, and a rectangular shaped top portion 36 that is positioned adjacent the top of the tubular member 12. A crease line, or line of thinned material, 58 is provided between the top and bottom portions 36, 54. Two holes 44 are provided through the top portion 36 and three holes 44 are provided through the bottom portion 54. In this example, the material of the conduit sleeve 10 may be more inflexible since the foam backer 110 provides the ability to adjust the angle of the conduit sleeve 10.

Figure 25:
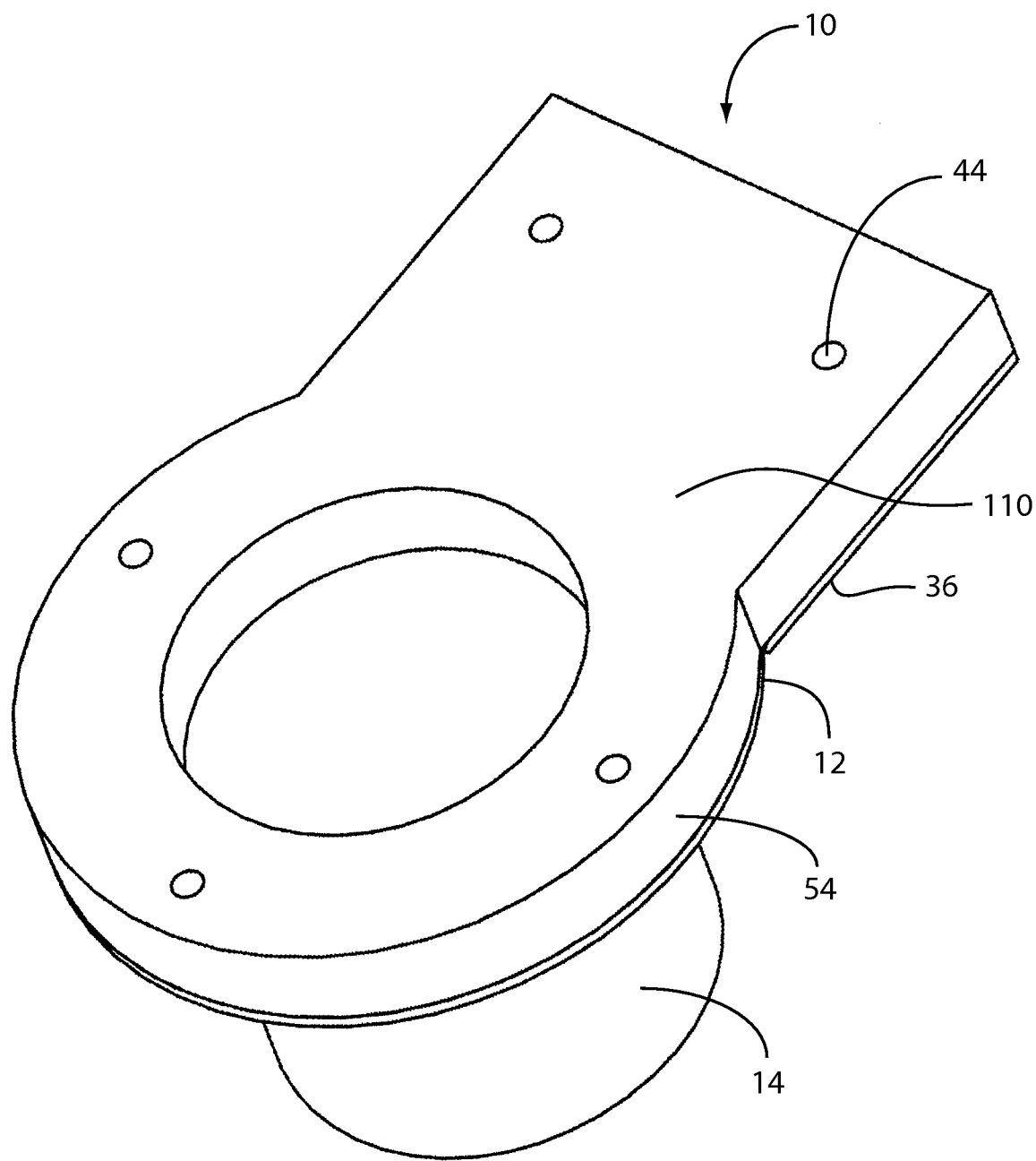
FIG. 25 is a rear perspective view of the example conduit sleeve of FIG. 24, shown with a foam backer.
Figure 26:
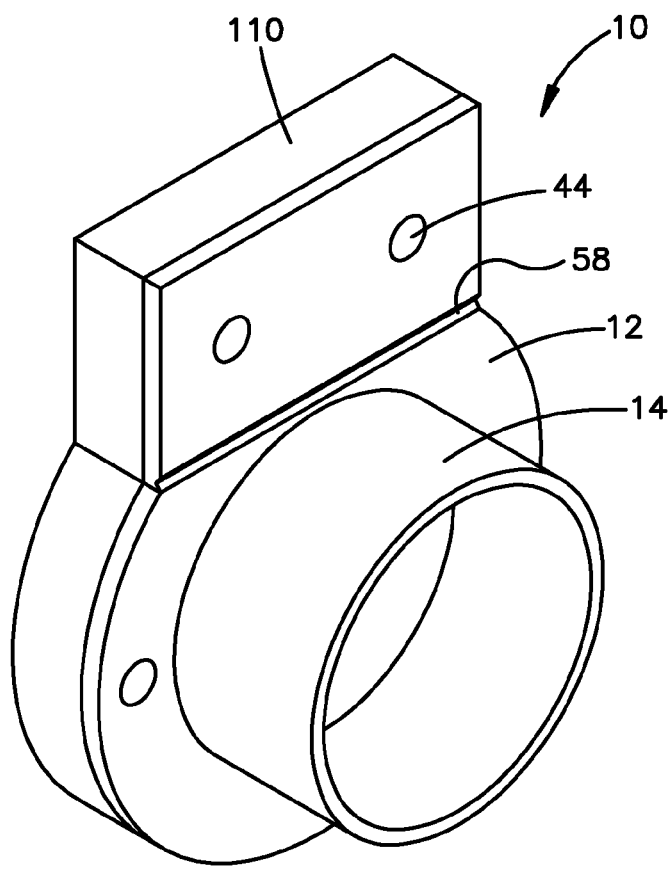
FIG. 26 is yet another perspective view of the example conduit sleeve of FIG. 24, shown with a foam backer.
Figure 27:
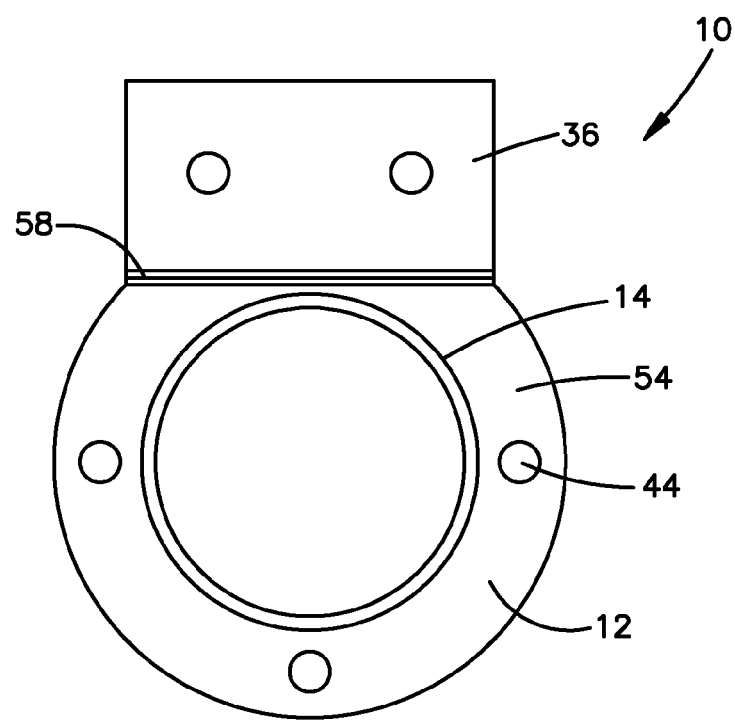
FIG. 27 is a front view of the conduit sleeve of FIG. 24.

As shown in FIG. 25, the foam backer 110 is several times thicker than the thickness of the flange 14 and is coupled to the rear face 34 of the flange 14. The foam backer 110 seats against the form 20 and nails 38 or other fasteners may be positioned through the holes 44 to couple the conduit sleeve 10 to the form 20. Since the foam is compressible, the user can adjust the angle of the conduit sleeve 10 by varying the depth of the nails through the foam backer 110 and flange 14. The flange 14 could be made of a high density polyethethylene, for example. The rear side 34 of the flange 14 is preferably solid such that concrete 24 does not enter the conduit sleeve 10 when the concrete is poured. The inside diameter of the tubular member 12 is approximately the same width as the outside diameter of the conduit 16 that seats inside the tubular member 12 such that a friction fit exists when the conduit 16 is installed inside the tubular member 12.

Figure 28:
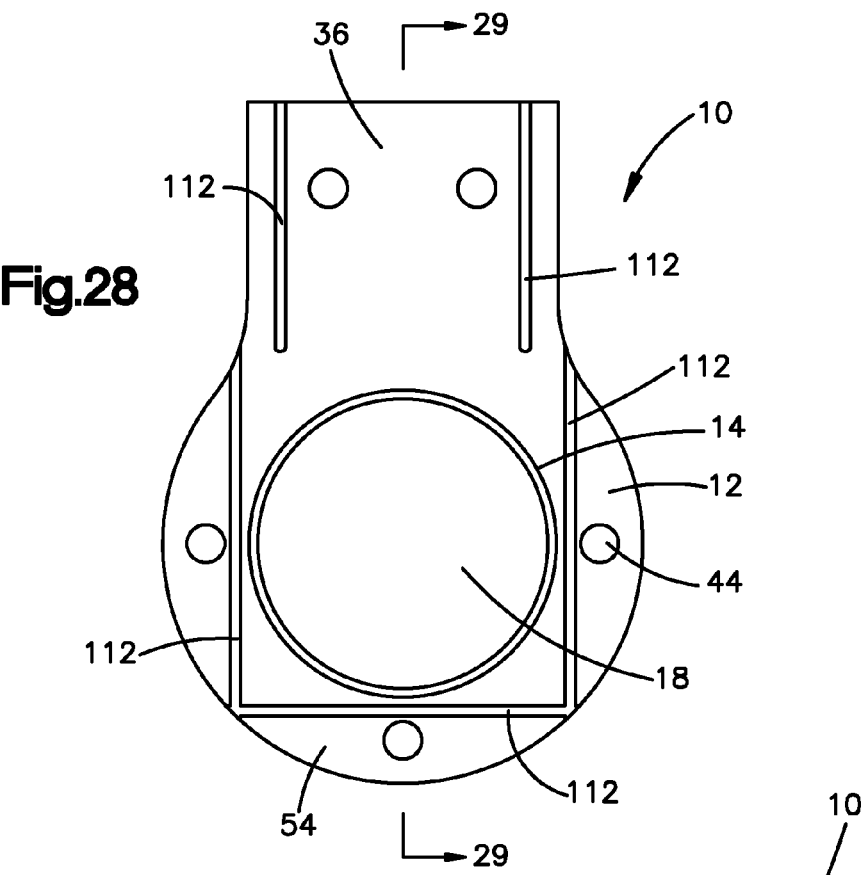
FIG. 28 is a front view of another example conduit sleeve.
Figure 29:
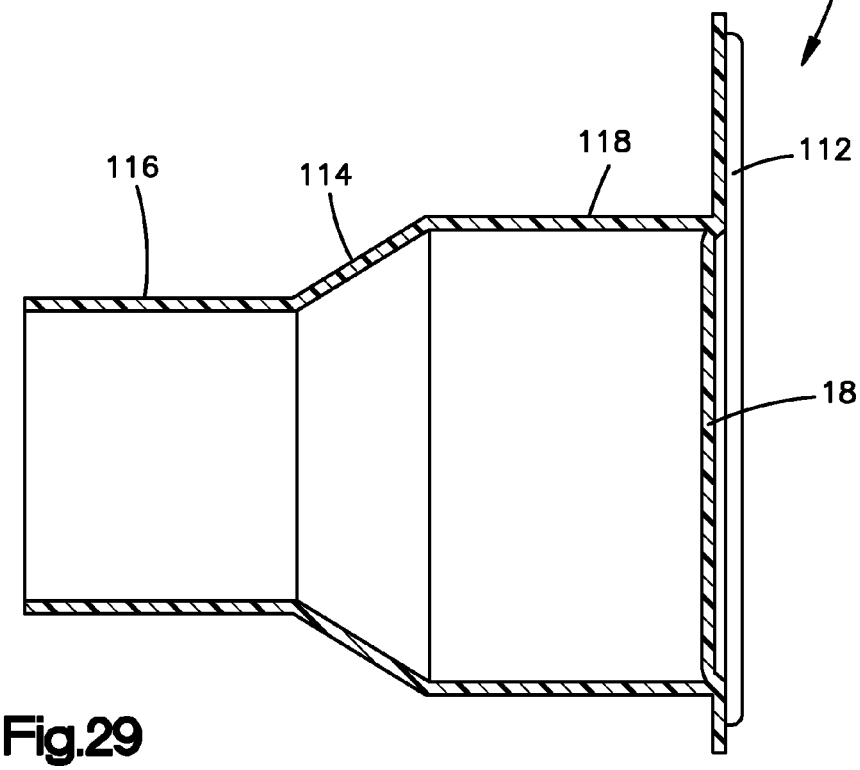
FIG. 29 is a side view of the conduit sleeve of FIG. 28.

FIGS. 28 and 29 depict an alternative example conduit sleeve 10. In this example, the rear face 34 of the flange 14 has multiple crush ribs 112. The flange 14 includes a knockout in the central portion 18. As shown in FIG. 29, the tubular member 12 has two different diameters with a transition portion 114 between the smaller diameter section 116 and the larger diameter section 118 of the tubular member 12. With this example, part of the tubular member 12 may be cut away if a larger diameter conduit is needed, or the entire length of the tubular member 12 can remain when a smaller diameter conduit is used. Crush ribs 112 may be provided on the rear face 34 of the flange 14 in order to allow some variation in terms of angle of the flange 14 relative to the form 20. By inserting the connecting nails or screws deeper into the form 20 at different hole locations, the angle of the flange 14 can be modified relative to the form 20. The ribs crush against the form 20 to assist in adjusting the angle.

Figure 30:
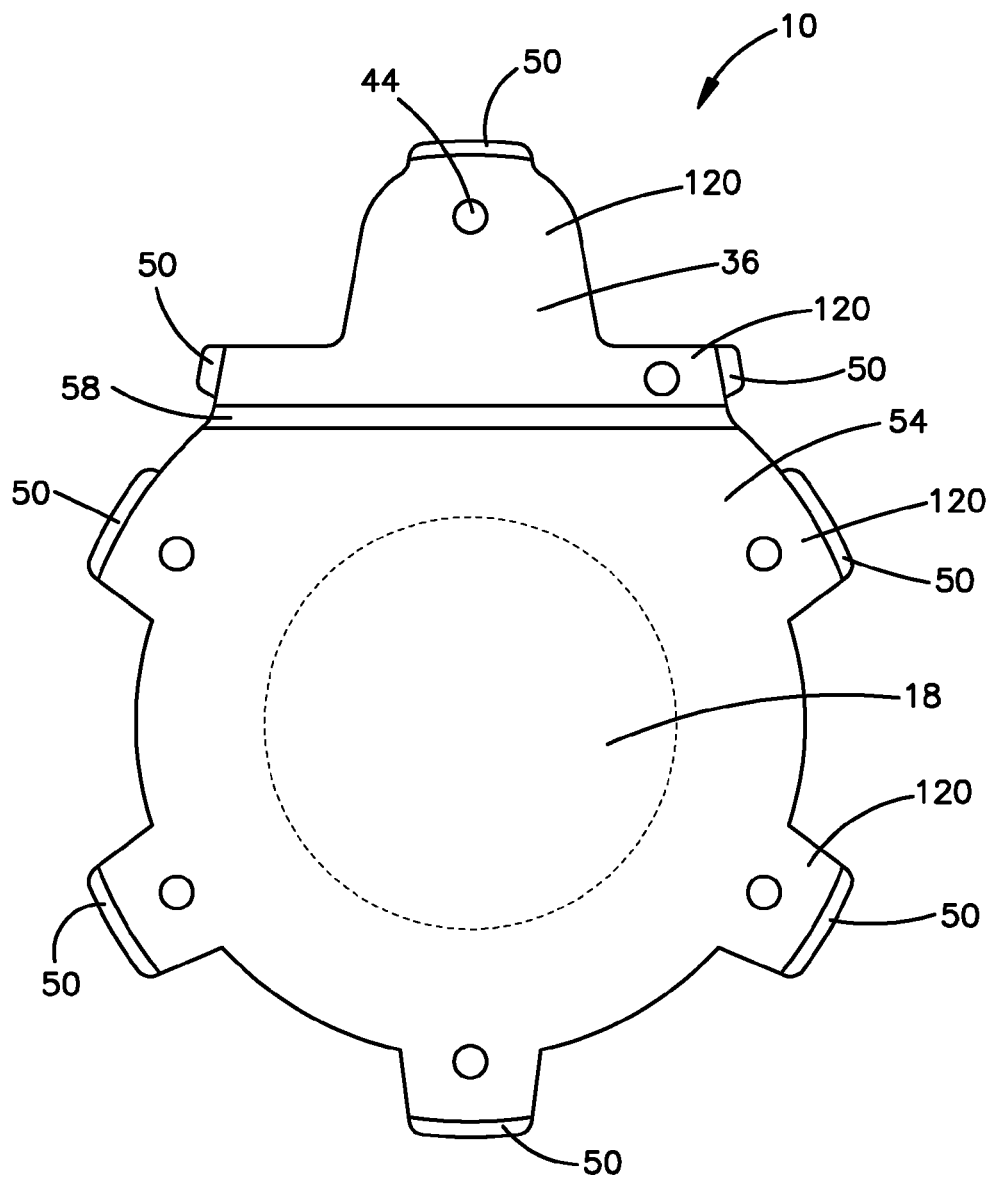
FIG. 30 is a front view of another example conduit sleeve.

FIG. 30 represents an alternative example conduit sleeve flange 14. In this example, material is removed from the flange 14 relative to earlier discussed designed, thereby saving material costs. In this example, a top portion 36 is separated from a bottom portion 54 of the flange 14 by a thinned section 58. The top portion 36 of the flange 14 may be folded over a form 20 and includes three connecting holes 44 into which nails 38 can be inserted to couple the flange 14 to a form 20. The bottom portion 54 includes five tab-like portions 120 that encircle the central portion 18. A hole 44 is provided in each tab 120 for securing the flange 14 to a form 20. The central portion 18 may be knocked out after the concrete 24 is poured and has set.

Figure 31:
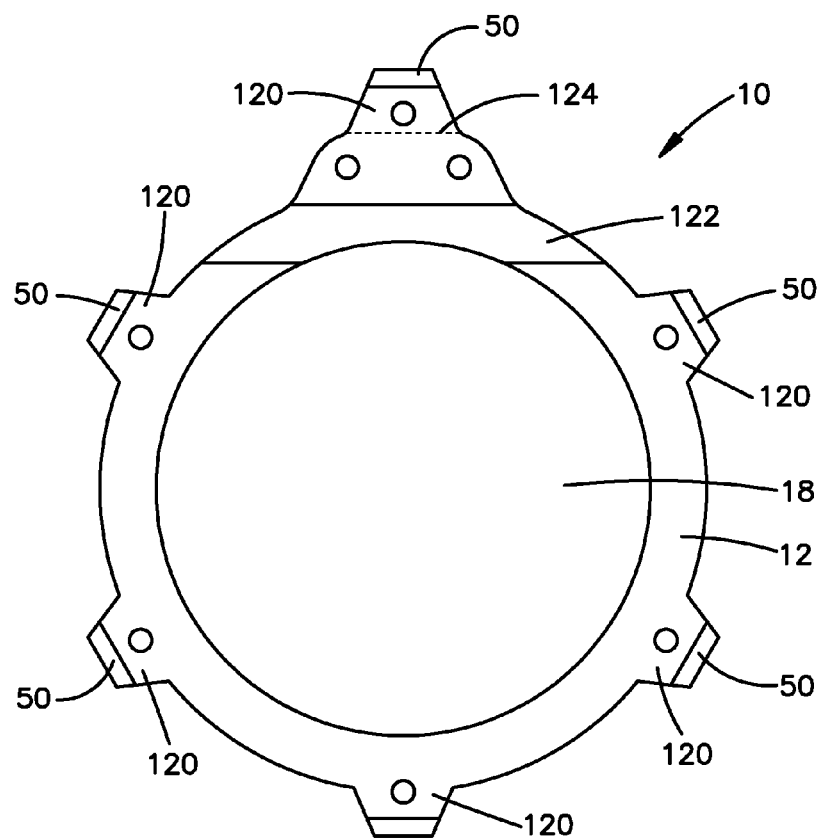
FIG. 31 is a front view of yet another example conduit sleeve.

FIG. 31 is similar to FIG. 30, but has a larger thinned portion 122 at the top of the central portion 18 and an additional fold line 124 in the center of the top portion 36. The additional fold line 124 is provided between the top-most hole and the two lower holes in the top portion 36. A multi-fold line design may be used if the form 20 has some variation in its structure and is not simply flat. In addition, outwardly extending tabs 50 may be utilized with lips 52, if desired, to hold the conduit sleeve 10 in position.

Figure 32:
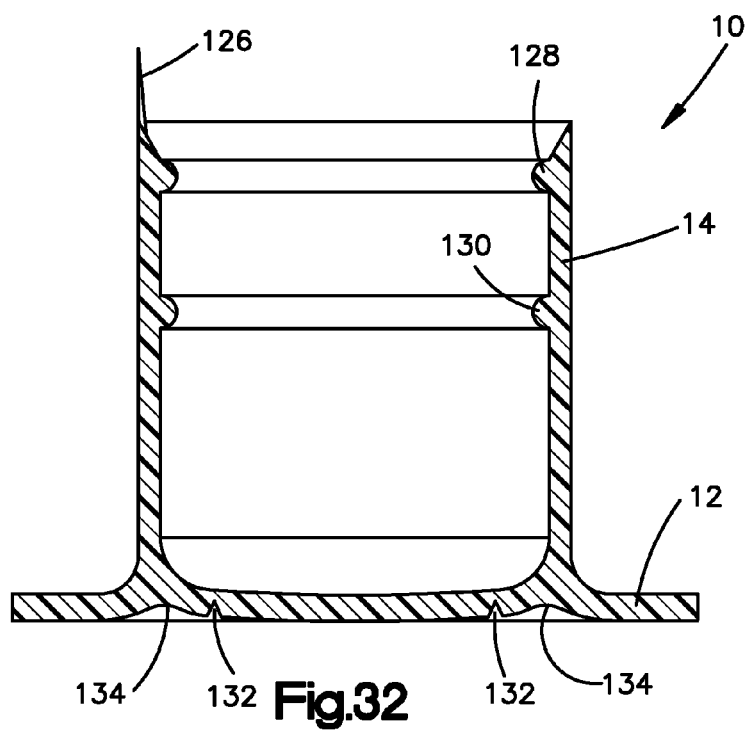
FIG. 32 is a cross-sectional side view of the conduit sleeve of FIG. 31.

FIG. 32 depicts schematically several different techniques for firmly securing a conduit to the tubular member 12. On the left side of the tubular member 12, a thin flap 126 is shown extending outwardly longitudinally from the edge of the tubular member 12. As shown, this flap 126 can be folded down as the conduit 16 enters the tubular member 12 to create a friction fit between the conduit 16 and the interior of the tubular member 12. The right side of the tubular member 12, as depicted in FIG. 32, shows an alternative example where an O-ring 128 is positioned in the interior of the opening of the tubular member 12. The O-ring 128 can assist in retaining the conduit 16 inside the tubular member 12 and can also prevent concrete 24 from entering the tubular member 12 and conduit 16 during the concrete pour. A second O-ring 130 can be positioned inwardly from the opening of the tubular member 12 to further assist in preventing concrete 24 from entering the tubular member 12. The tubular member 12 may have a tapered entrance 46 to allow the conduit 16 to easily enter the tubular member 12. FIG. 32 shows that score lines 132 may be positioned on the rear face 34 of the flange 14 in order to identify the central portion 18. In addition, indentations 134 may be molded into the rear face 34 of the flange 14 to identify the boundaries of the central portion 18.

Figure 33:
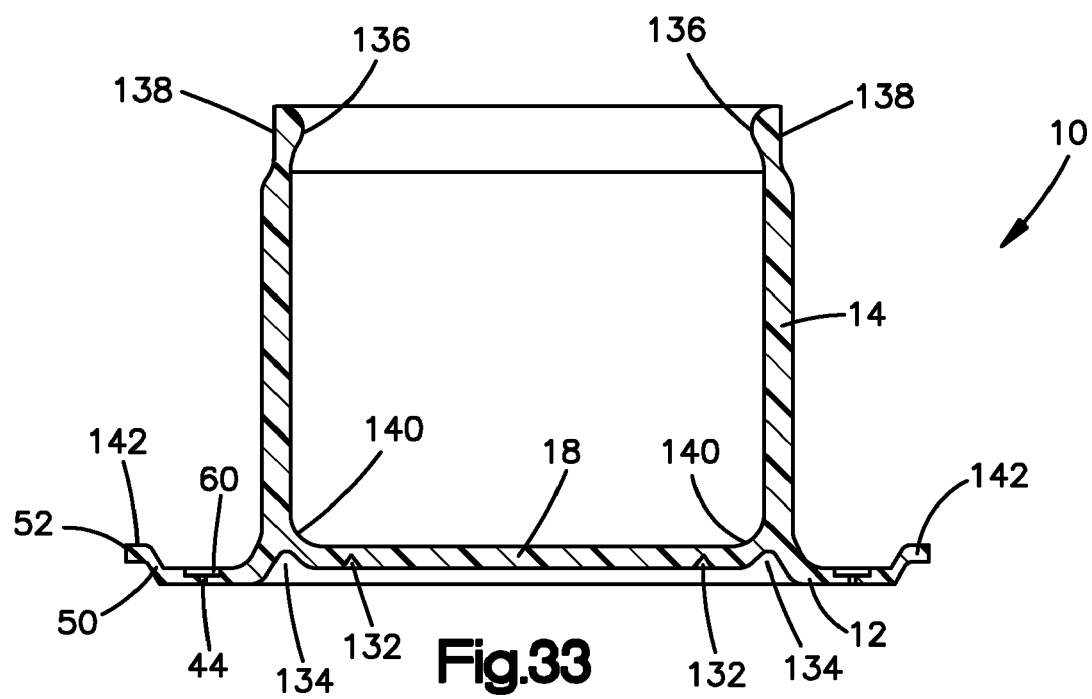
FIG. 33 is another example conduit sleeve shown in a cross-sectional side view.

FIG. 33 is an alternative example of a conduit sleeve 10 showing a different technique for creating a friction fit between the tubular member 12 and the adjoining conduit 16. In this example, the forward end of the tubular member 12 has a molded in rib 136 that serves to narrow the entrance of the tubular member 12, but that also provides a wider opening initially because of the shape of the rib 136. The forward end of the tubular member 12 has a thinned section 138 relative to the remainder of the tubular member 12 in order to impart flexibility to the part to allow the conduit 16 to enter the opening. A positive stop 140 is provided by the solid surface of the flange 14 at the central portion 18. The central portion 18 is scored in order to identify where the central portion 18 may be knocked out. In addition, the central portion 18 is recessed relative to the remainder of the flange 14. The flange 14 includes arms 142 that bend forward relative to the face of the flange 14. These arms 142 will be encased in concrete 24 after the concrete is poured in order to provide better stability to the conduit sleeve 10 after the form 20 is removed. As with prior examples, holes 44 are provided through the face of the flange 14 to couple the flange 14 to a concrete form 20.

Figure 34:
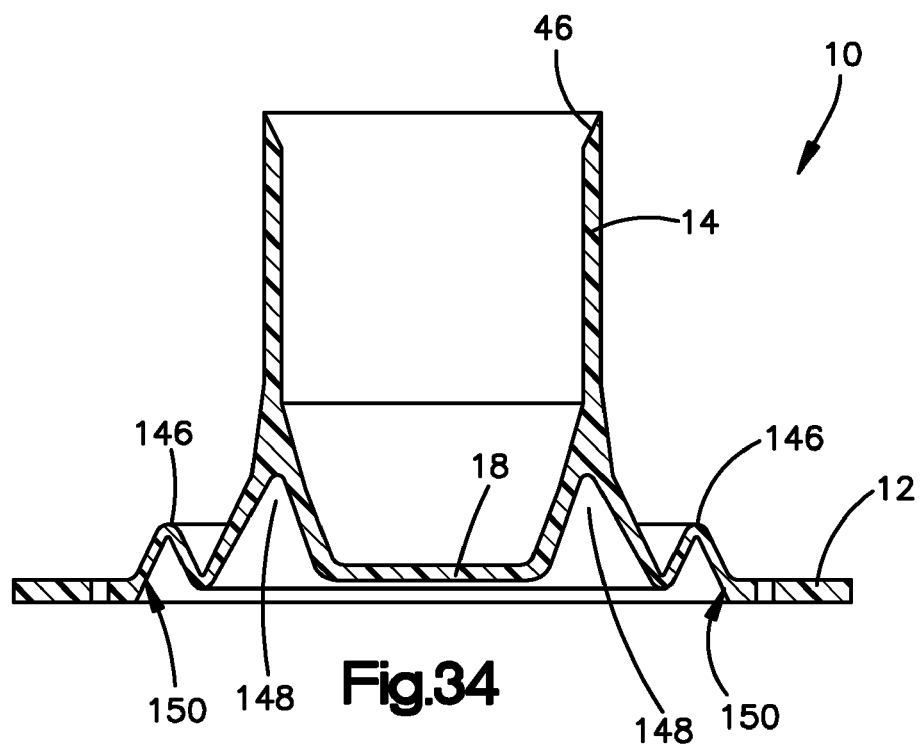
FIG. 34 is yet another example conduit sleeve shown in a cross-sectional side view.

FIG. 34 is another example conduit sleeve 10 that has a thinned wall section 146 on the flange 14 in order to provide greater flexibility to the flange 14 to allow for angling of the tubular member 12 relative to the flange 14. The tubular member 12 has a flared opening 46 to allow a conduit 16 to easily enter the tubular member 12. A friction fit may then be created by designing the inside diameter of the tubular member 12 to closely match the outside diameter of a conduit 16. The flange 14 has a deeper depression 148 in the vicinity of the central portion 18, which can be cut away after the concrete 24 is poured. The central portion 18 is recessed relative to the rear face 34 of the flange 14. The flange 14 angles away at the outside diameter of the tubular member 12 to a bellows portion 150. The bellows portion 150 includes pleats and the pleats are thinned relative to the remainder of the flange 14 wall in order to impart greater flexibility.

Figure 36:
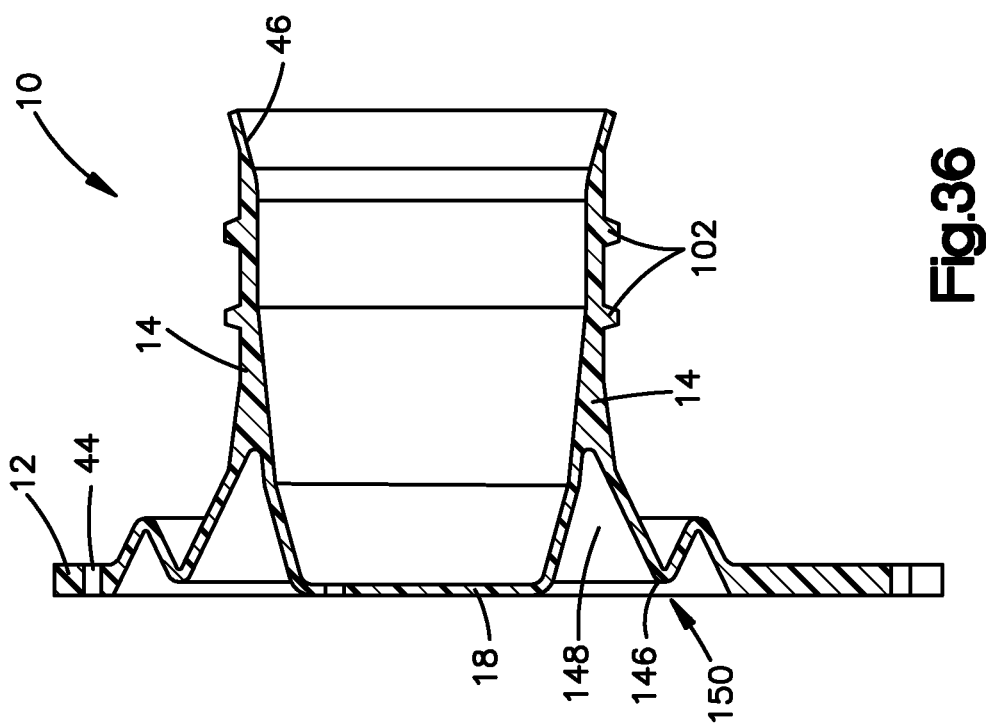
FIG. 36 is a cross-sectional side view of the example conduit sleeve shown in FIG. 35.
Figure 35:
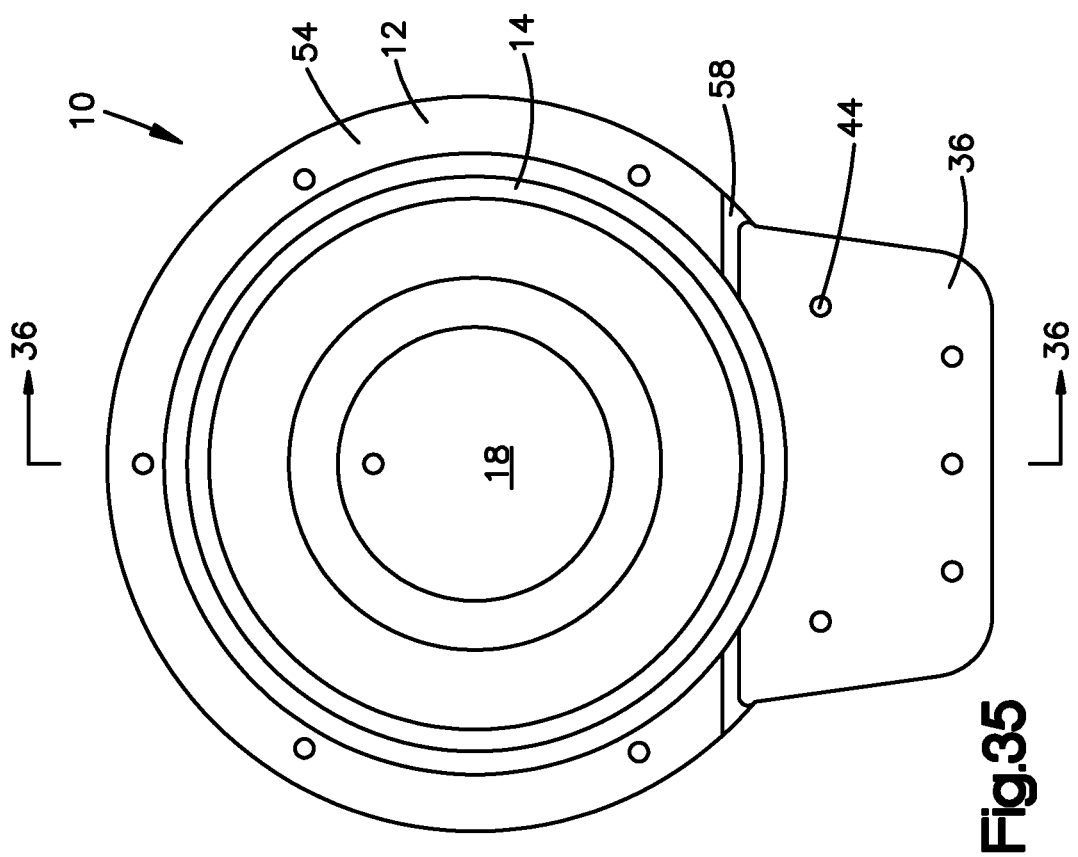
FIG. 35 is a front view of another example conduit sleeve.
Figure 37:
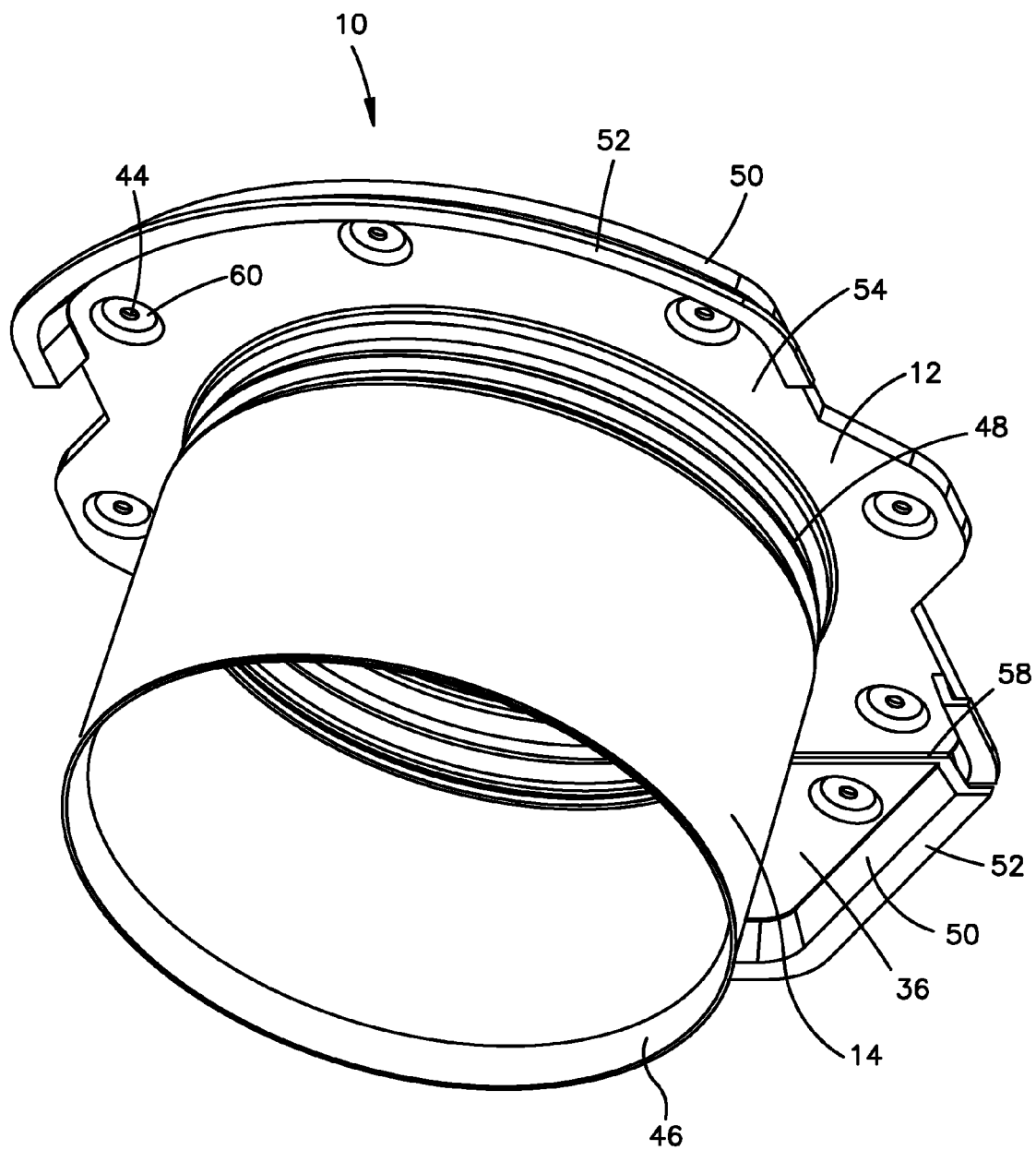
FIG. 37 is a perspective view of another example conduit sleeve.
Figure 39:
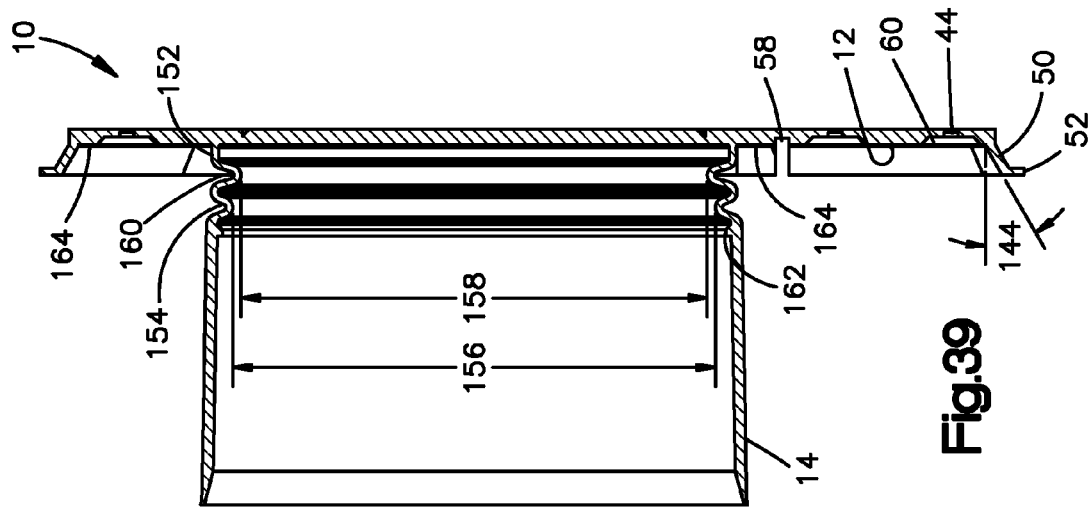
FIG. 39 is a cross-sectional side view of the example sleeve, taken at line 39-39 of FIG. 38.

FIGS. 35 and 36 depict an alternative example conduit sleeve 10 that has a key-hole shape. The conduit sleeve 10 includes a tubular member 12 and a flange 14. The flange 14 has a top portion 36 (shown on the bottom in FIG. 35) that is positioned adjacent the top of the central portion 18. The flange 14 has a bottom portion 54 (shown on the top in FIG. 35). The bottom portion 54 encircles the central portion 18 while the top portion 36 extends as a tab-like section upwardly from the central portion 18. The top and bottom portions 36, 54 are separated by a relief or thinned section 58 on the flange 14, which allows for easily bending the top portion 36 relative to the bottom portion 54 around a concrete form 20. In the example shown, five holes 44 extend through the top portion 36 for coupling the flange 14 to a form 20 and five holes 44 extend through the bottom portion 54 for coupling the flange 14 to the form 20.

FIG. 36 shows a tubular member 12 that has a flared opening 46 for receiving a conduit 16. The exterior of the tubular member 12 includes cylindrical ribs 102 that are used to assist in maintaining the tubular member 12 inside the concrete 24 once the concrete has been poured. In this example, the central portion 18 is flush with the rear face 34 of the flange 14, but the flange 14 includes a bellows or pleated section 150 that imparts flexibility to the flange 14 and allows the tubular member 12 to be positioned at an angle of other than 90 degrees relative to the angle of the flange 14.

FIGS. 37-40 depict an alternative example conduit sleeve 10, designed to receive a 4" conduit. In this example, the conduit sleeve 10 includes a flange 14 and a tubular member 12. The opening of the tubular member 12 has a tapered portion 46 in order to allow a conduit 16 to easily enter the tubular member 12. After passing through the tapered portion 46, a friction fit is created between the tubular member 12 and the conduit 16. A plurality of pleats or bellows 64 are provided on the tubular member 12 adjacent the flange 14. A short section 152 of the tubular member 12 is positioned between the front face of the flange 14 and the bellows 48. In this example, the bellows 48 includes two pleats 64, with a first forward pleat 154 having an inner diameter 156 that is smaller than an inner diameter 158 of a second rearward pleat 160. A cylindrical stop 162 is positioned inside the tubular member 12 forward of the first pleat 154 in order to prevent a conduit 16 that is installed inside the tubular member 12 from interfering with the bellows 48. As with prior examples, the bellows 48 are used to allow the flange 14 to be angled relative to the concrete form 20. This provides flexibility and allows for an angled form 20 while still maintaining the conduit 16 in a horizontal position.

Figure 38:
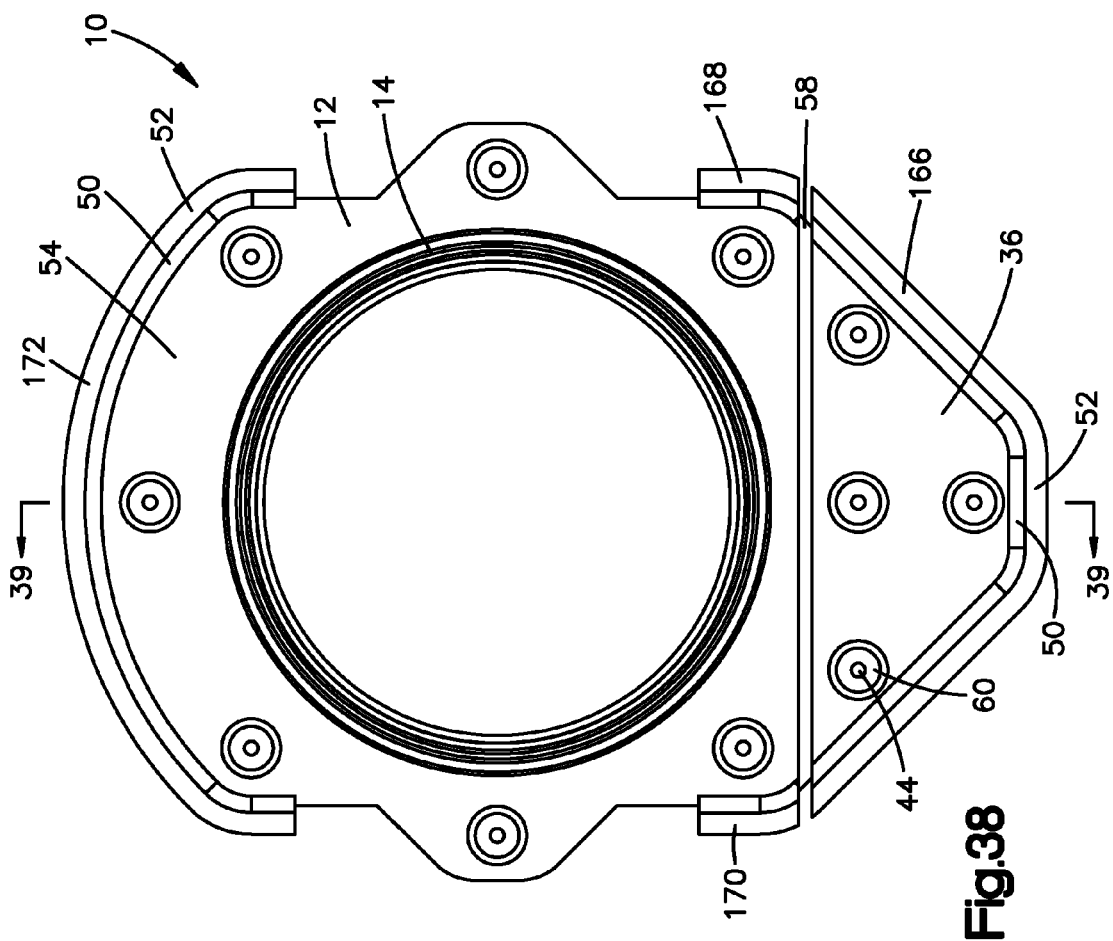
FIG. 38 is a front view of the example sleeve of FIG. 37.

FIG. 38 depicts the forward face 164 of the flange 14. The forward face 164 includes a top portion 36 and a bottom portion 54. The top portion 36 is separated from the bottom portion 54 by a section of thinned material 58. This section of thinned material 58 allows for ease in folding the top portion 36 over onto the concrete form 20. As with prior examples, a plurality of forward facing tabs 50 extend from the front face of the flange 14. The tabs 50 include an outwardly extending finger 52. The tabs 50 are angled at an approximately 30 degree angle 144 relative to perpendicular, but could be angled at a different angle, if desired. The fingers 52 are approximately parallel to the plane of the flange 14. The tabs 50 and fingers 52 are used to maintain the conduit sleeve 10 inside the concrete 24 after the concrete has been poured and hardens. The tabs 50 and fingers 52 extend in four different sections around the periphery of the flange 14. A first section 166 of the tabs/fingers 52 extends around the peripheral edge of the top portion 36. Two shorter sections 168, 170 extend at either side of the thinned portion 58. Another fourth section 172 extends around the bottom edge of the bottom portion 54.

In this example, the thinned portion 58 of the flange 14 is positioned above the central portion 18, rather than directly adjacent the central portion 18. The top portion 36 of the flange 14 includes four holes 44 for coupling the top portion 36 to the form 20. The bottom portion 54 includes seven holes 44 for coupling the bottom portion 54 to the form 20. Each of the holes 44 includes a recessed section 60 that allows the form 20 to be easily broken away from the conduit sleeve 10 when nails or fasteners are positioned through the holes 44.

Figure 40:
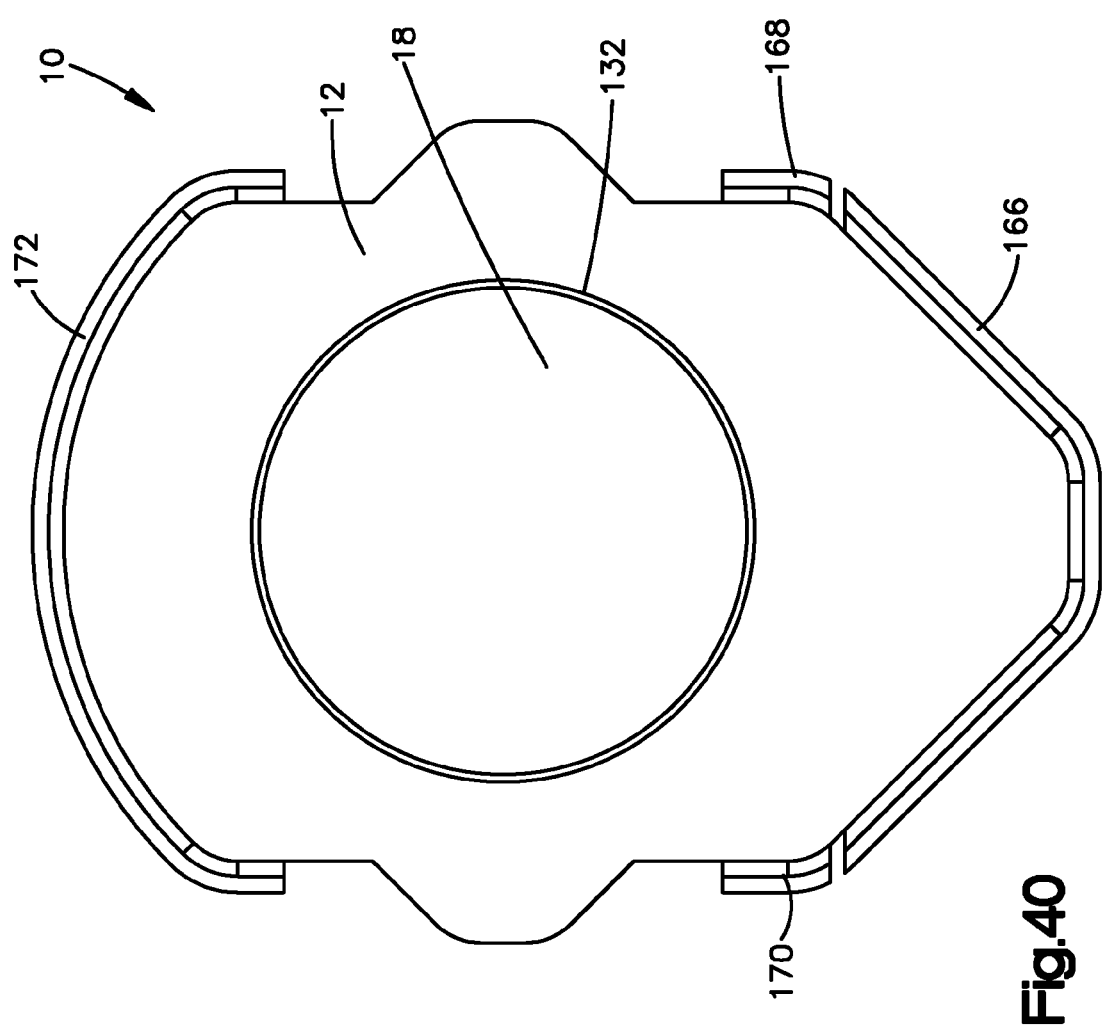
FIG. 40 is a rear view of the example conduit sleeve of FIG. 38, showing the sealed end.
Figure 41:
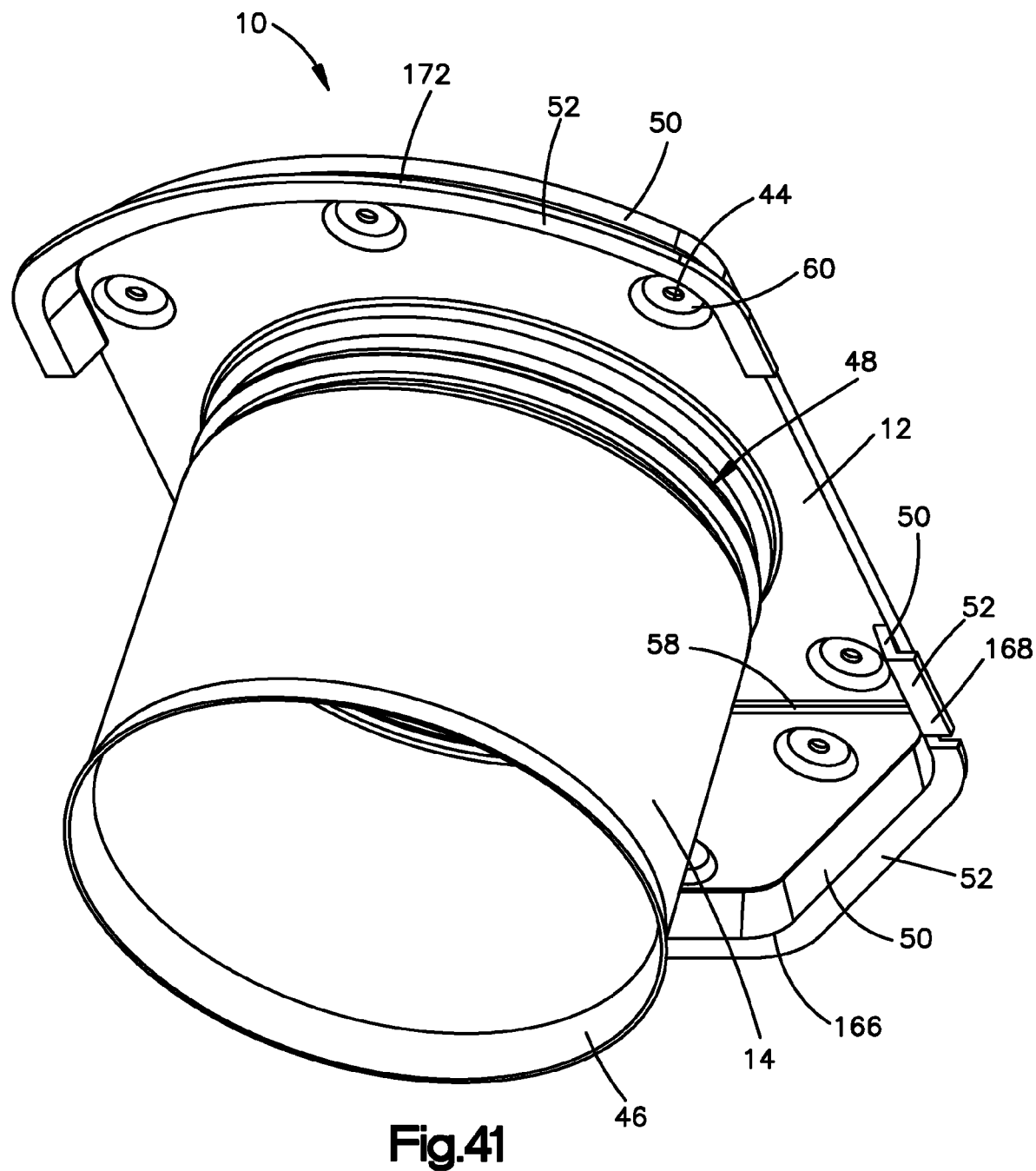
FIG. 41 is a perspective view of another example conduit sleeve.
Figure 46:
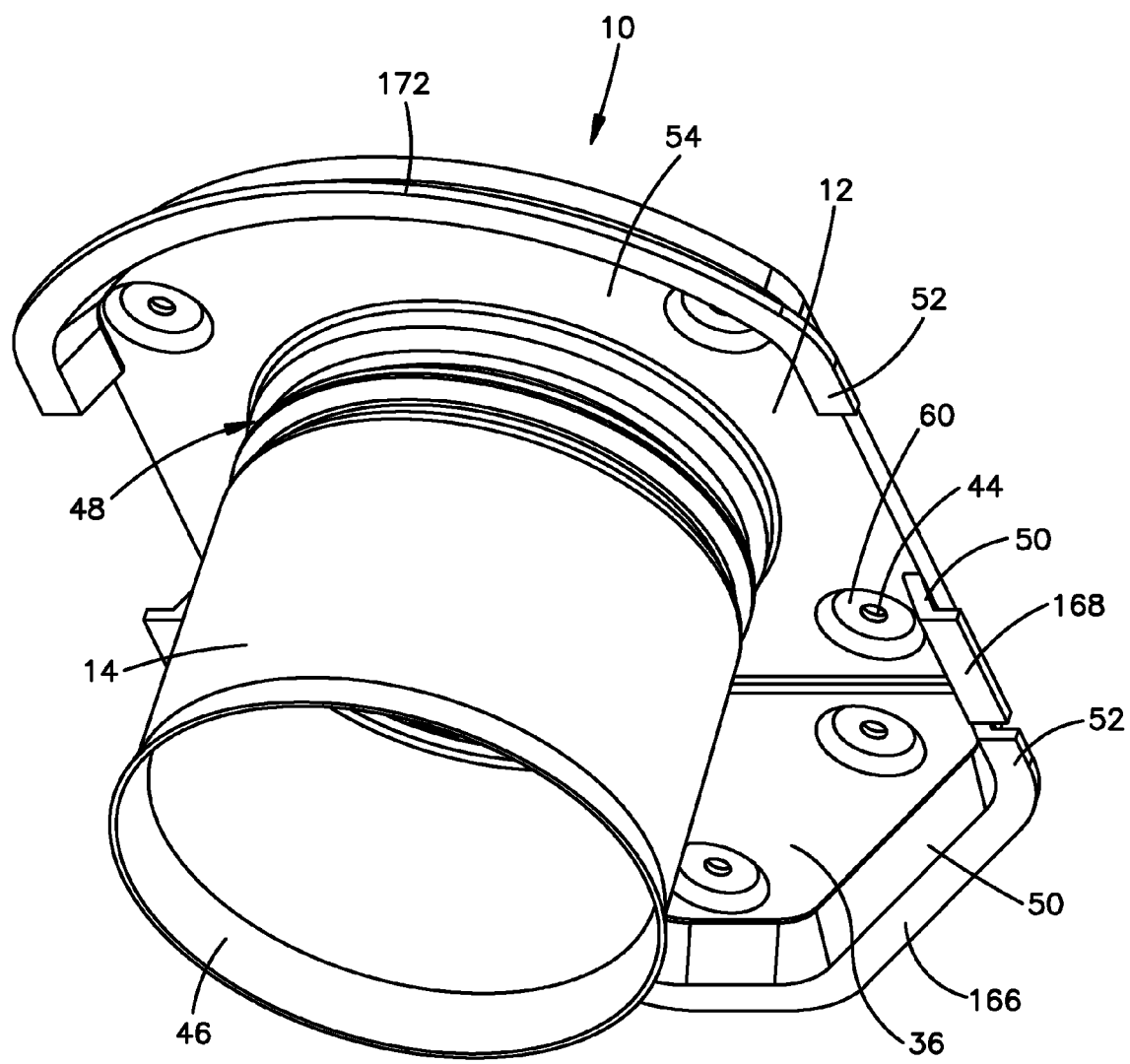
FIG. 46 is a perspective view of yet another example conduit sleeve.
Figure 48:
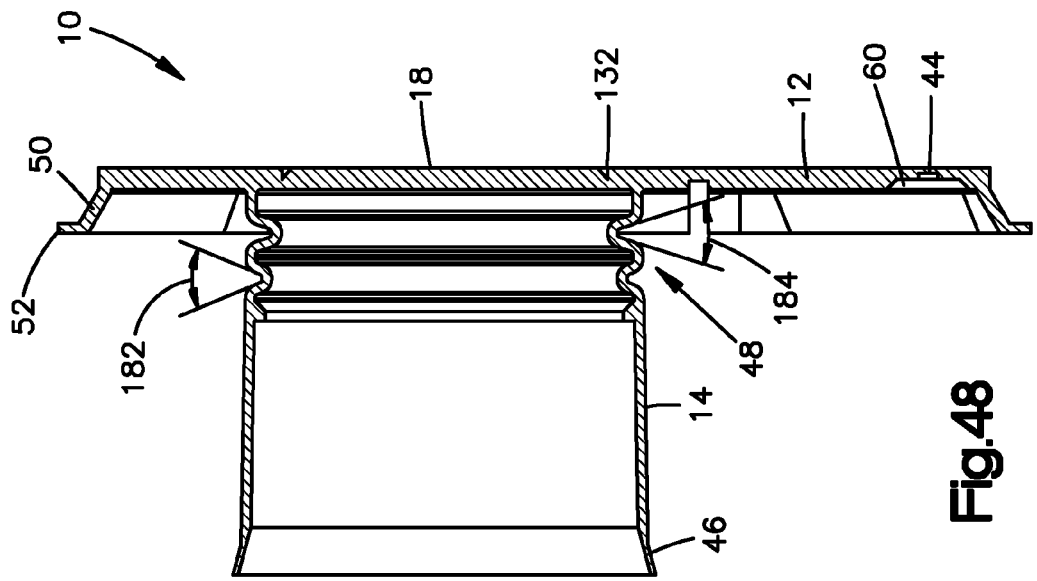
FIG. 48 is a cross-sectional side view of the example conduit sleeve, taken at line 48-48 of FIG. 47.

FIG. 40 shows the rear face 34 of the flange 14. A central portion 18 is demarcated by a score line 132. The user cuts along the score line 132 after the conduit sleeve 10 has been set into the concrete 24 to open the pass through 22. The angles of the pleats, discussed above, can range in size. However, one example angle 174 is 42 degrees for the forward most pleat and the other example angle 176 is 30 degrees for the rearward pleat.

FIGS. 41-45 depict an alternative example conduit sleeve 10, designed to receive a 3" conduit. In this example, the conduit sleeve 10 includes a flange 14 and a tubular member 12. The opening of the tubular member 12 has a tapered portion 46 in order to allow a conduit 16 to easily enter the tubular member 12. The taper may be at a 15 degree angle relative to the inside of the tubular member 12. After a conduit 16 passes through the tapered portion 46, a friction fit is created between the tubular member 12 and the conduit 16. A plurality of pleats 64 or bellows are provided on the tubular member 12 adjacent the flange 14. A short section 152 of the tubular member 12 is positioned between the front face 164 of the flange 14 and the bellows. In this example, the bellows 48 includes two pleats 64, with a first forward pleat 154 having an inner diameter 156 that is smaller than a second inner diameter 158 of a second rearward pleat 160. As shown in FIG. 45, the first pleat 154 may have an first angle 178 of 40 degrees and the second pleat 160 may have a second angle 180 of 30 degrees. Other angles may also be used effectively. A cylindrical stop 162 is positioned inside the tubular member 12 forward of the first pleat 154 in order to prevent a conduit 16 that is installed inside the tubular member 12 from interfering with the bellows 48. As with prior examples, the bellows 48 are used to allow the flange 14 to be angled relative to the concrete form 20. This provides flexibility and allows for an angled form 20 while still maintaining the conduit 16 in a horizontal position.

FIG. 42 depicts the forward face 164 of the flange 14. The forward face 164 includes a top portion 36 and a bottom portion 54. The top portion 36 is separated from the bottom portion 54 by a section of thinned material 58. This section of thinned material 58 allows for ease in folding the top portion 36 over onto the concrete form 20. As with prior examples, a plurality of forward facing tabs 50 extend at an angle from the front face of the flange 14. The tabs 50 include an outwardly extending finger 52. The tabs 50 are angled at an approximately 30 degree angle relative to perpendicular, but could be angled at a different angle, if desired. The fingers 52 are approximately parallel to the plane of the flange 14, but could be angled relative to the plane of the flange 14. The tabs 50 and fingers 52 are used to assist in maintaining the conduit sleeve 10 inside the concrete 24 after the concrete has been poured and hardens. The tabs 50 and fingers 52 extend in four different sections around the periphery of the flange 14. One section 166 of the tabs/fingers 52 extends around the edge of the top portion 36. Two shorter sections 168, 170 extend at either side of the thinned portion 58 but within the bottom portion 54. Another section 172 extends around the bottom edge of the bottom portion 54.

In this example, the thinned portion 58 of the flange 14 is positioned above the central portion 18, rather than directly adjacent the central portion 18. The top portion 36 of the flange 14 includes three holes 44 for coupling the top portion 36 to the form 20. The bottom portion 54 includes five holes 44 for coupling the bottom portion 54 to the form 20. Two of the five holes 44 are positioned adjacent the thinned portion 58 and three of the holes 44 are positioned adjacent the bottom end of the flange 14. Each of the holes 44 includes a recessed section 60 that allows the form 20 to be easily broken away from the conduit sleeve 10 when nails or screws are positioned through the holes 44.

FIG. 44 shows the rear face 34 of the flange 14. A central portion 18 is demarcated by a score line 132. The user cuts along the score line 132 after the conduit sleeve 10 has been set into the concrete 24 to open the pass through 22.

FIGS. 46-49 depict an alternative example conduit sleeve 10, designed to receive a 2" conduit. In this example, the conduit sleeve 10 includes a flange 14 and a tubular member 12. The opening of the tubular member 12 has a tapered portion 46 in order to allow a conduit 16 to easily enter the tubular member 12. After passing through the tapered portion 46, a friction fit is created between the tubular member 12 and the conduit 16. A plurality of pleats 64 or bellows are provided on the tubular member 12 adjacent the flange 14. A short section 152 of the tubular member 12 is positioned between the front face 164 of the flange 14 and the bellows 48. In this example, the bellows 48 includes two pleats 64, with a first forward pleat 154 having an inner diameter 156 that is smaller than an inner diameter 158 of a second rearward pleat 160. A cylindrical stop 162 is positioned inside the tubular member 12 forward of the first pleat 154 in order to prevent a conduit 16 that is installed inside the tubular member 12 from interfering with the bellows 48. As with prior examples, the bellows 48 are used to allow the flange 14 to be angled relative to the concrete form 20. This provides flexibility and allows for an angled form 20 while still maintaining the conduit 16 in a horizontal position.

Figure 47:
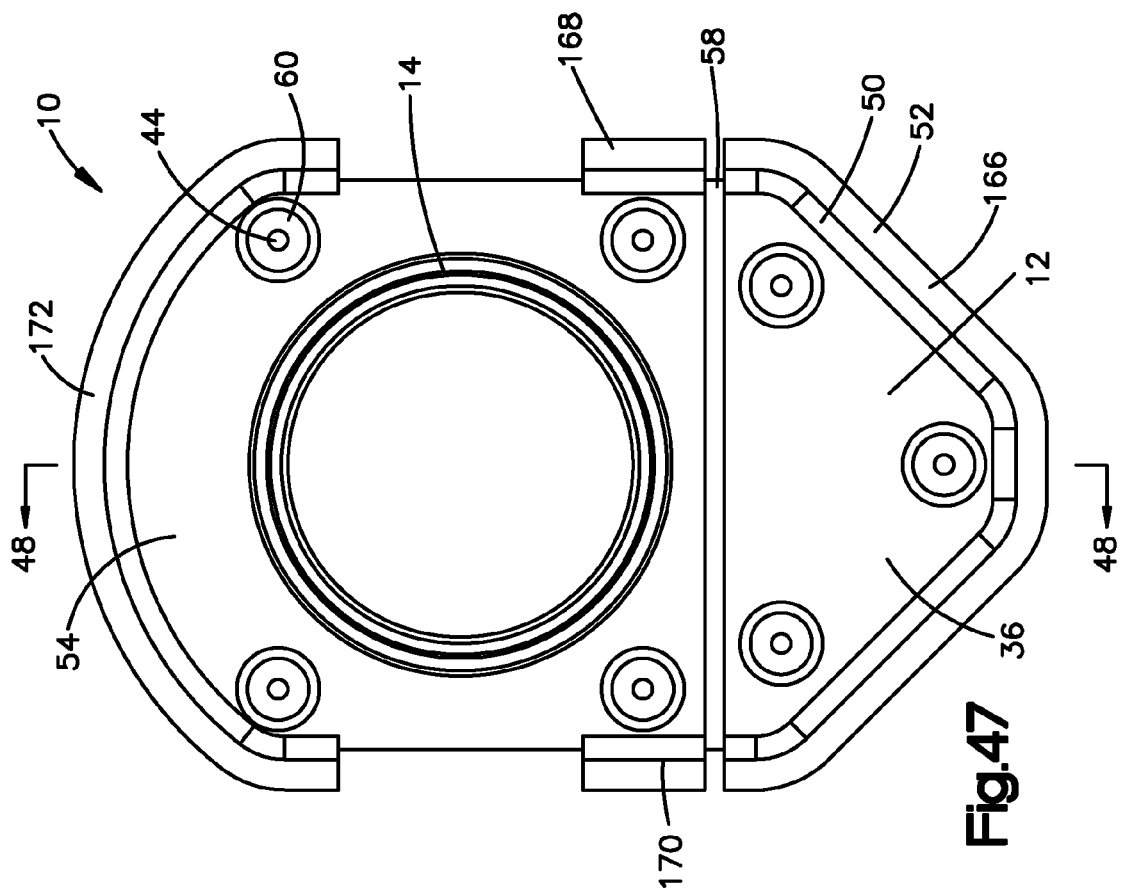
FIG. 47 is a front view of the example conduit sleeve of FIG. 46.

FIG. 47 depicts the forward face 164 of the flange 14. The forward face 164 includes a top portion 36 and a bottom portion 54. The top portion 36 is separated from the bottom portion 54 by a section of thinned material 58. This section of thinned material 58 allows for ease in folding the top portion 36 over onto the concrete form 20. As with prior examples, a plurality of forward facing tabs 50 extend from the front face 164 of the flange 14. The tabs 50 include an outwardly extending finger 52. The tabs 50 are angled at an approximately 30 degree angle relative to perpendicular, but could be angled at a different angle, if desired. The fingers 52 are approximately parallel to the plane of the flange 14. The tabs 50 and fingers 52 are used to maintain the conduit sleeve 10 inside the concrete 24 after the concrete has been poured and hardens. The tabs 50 and fingers 52 extend in four different sections around the periphery of the flange 14. One section 166 of the tabs/fingers 52 extends around the edge of the top portion 36. Two shorter sections 168, 170 extend at either side of the thinned portion 58. Another section 172 extends around the bottom edge of the bottom portion 54.

In this example, the thinned portion 58 of the flange 14 is positioned above the central portion 18, rather than directly adjacent the central portion 18. The top portion 36 of the flange 14 includes three holes 44 for coupling the top portion 36 to the form 20. The bottom portion 54 includes four holes 44 for coupling the bottom portion 54 to the form 20. Two of the holes 44 are positioned above the tubular member 12 and two of the holes 44 are positioned below the tubular member 12. Each of the holes 44 includes a recessed section 60 that allows the form 20 to be easily broken away from the conduit sleeve 10 when nails or screws are positioned through the holes 44.

Figure 49:
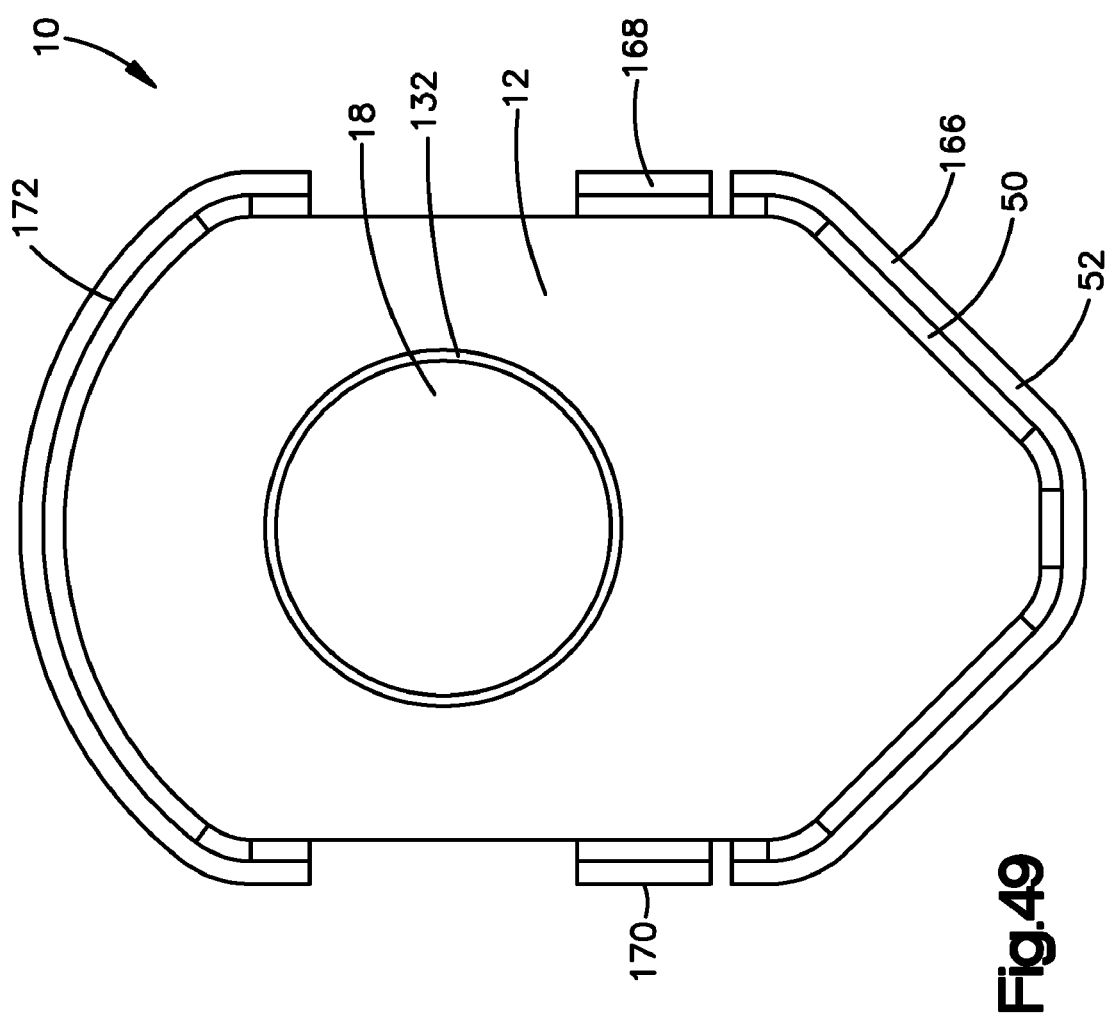
FIG. 49 is a rear view of the example conduit sleeve of FIG. 46.
Figure 50:
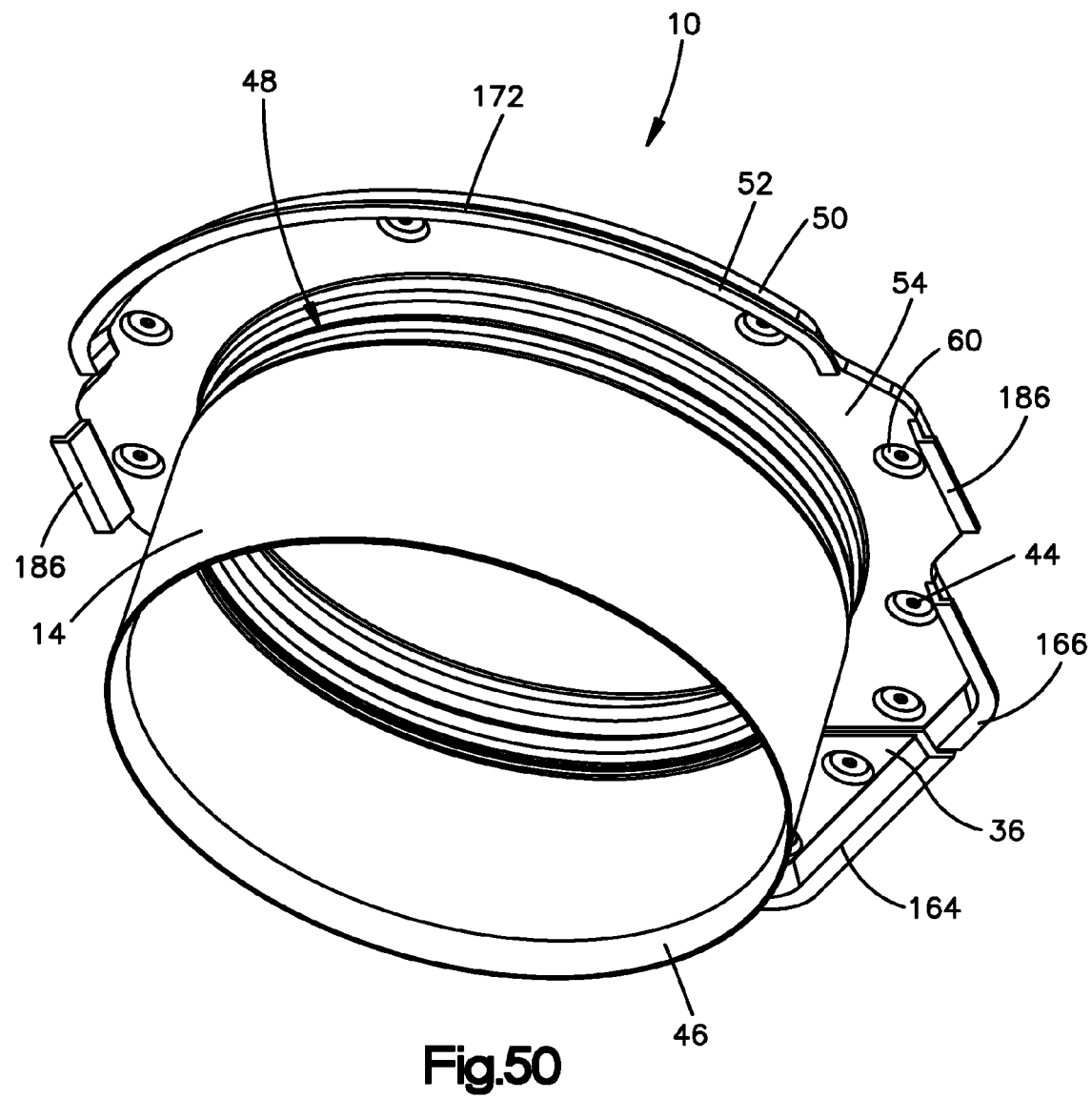
FIG. 50 is a perspective view of another example conduit sleeve.

FIG. 49 shows the rear face 34 of the flange 14. A central portion 18 is demarcated by a score line 132. The user cuts along the score line 132 after the conduit sleeve 10 has been set into the concrete 24 to open the pass through 22. The angles of the pleats 64, discussed above, can range in size. However, one example angle 182 is 45 degrees for the forward most pleat 154 and angle 184 of 35 degrees for the rearward pleat 160.

FIGS. 50-53 depict an alternative example conduit sleeve 10, designed to receive a 6" conduit. In this example, the conduit sleeve 10 includes a flange 14 and a tubular member 12. The opening of the tubular member 12 has a tapered portion 46 in order to allow a conduit 16 to easily enter the tubular member 12. After passing through the tapered portion 46, a friction fit is created between the tubular member 12 and the conduit 16. A plurality of pleats 64 or bellows 48 are provided on the tubular member 12 adjacent the flange 14. A short section 152 of the tubular member 12 is positioned between the front face 164 of the flange 14 and the bellows 48. In this example, the bellows 48 includes two pleats 64, with a first forward pleat 154 having an inner diameter 156 that is smaller than an inner diameter 158 of a second rearward pleat 160. A cylindrical stop 162 is positioned inside the tubular member 12 forward of the first pleat 154 in order to prevent a conduit 16 that is installed inside the tubular member 12 from interfering with the bellows 48. As with prior examples, the bellows 48 are used to allow the flange 14 to be angled relative to the concrete form 20. This provides flexibility and allows for an angled form 20 while still maintaining the conduit 16 in a horizontal position.

FIG. 51 depicts the forward face 164 of the flange 14. The forward face 164 includes a top portion 36 and a bottom portion 54. The top portion 36 is separated from the bottom portion 54 by a section of thinned material 58. This section of thinned material 58 allows for ease in folding the top portion 36 over onto the concrete form 20. As with prior examples, a plurality of forward facing tabs 50 extend from the front face of the flange 14. The tabs 50 include an outwardly extending finger 52. The tabs 50 are angled at an approximately 30 degree angle relative to perpendicular, but could be angled at a different angle, if desired. The fingers 52 are approximately parallel to the plane of the flange 14. The tabs 50 and fingers 52 are used to maintain the conduit sleeve 10 inside the concrete 24 after the concrete has been poured and hardens. The tabs 50 and fingers 52 extend in six different sections around the periphery of the flange 14. One section 166 of the tabs/fingers 52 extends around the edge of the top portion 36. Two shorter sections 168, 170 extend at either side of the thinned portion 58. Another section 172 extends around the bottom edge of the bottom portion 54. Two more sections 186 are positioned on the side edges of the bottom portion 54.

In this example, the thinned portion 58 of the flange 14 is positioned above the central portion 18, rather than directly adjacent the central portion 18. The top portion 36 of the flange 14 includes five holes 44 for coupling the top portion 36 to the form 20. The bottom portion 54 includes nine holes 44 for coupling the bottom portion 54 to the form 20. The nine holes 44 are spaced around the periphery of the central portion 18. Each of the holes 44 includes a recessed section 60 that allows the form 20 to be easily broken away from the conduit sleeve 10 when nails 38 or other fasteners are positioned through the holes 44.

Figure 53:
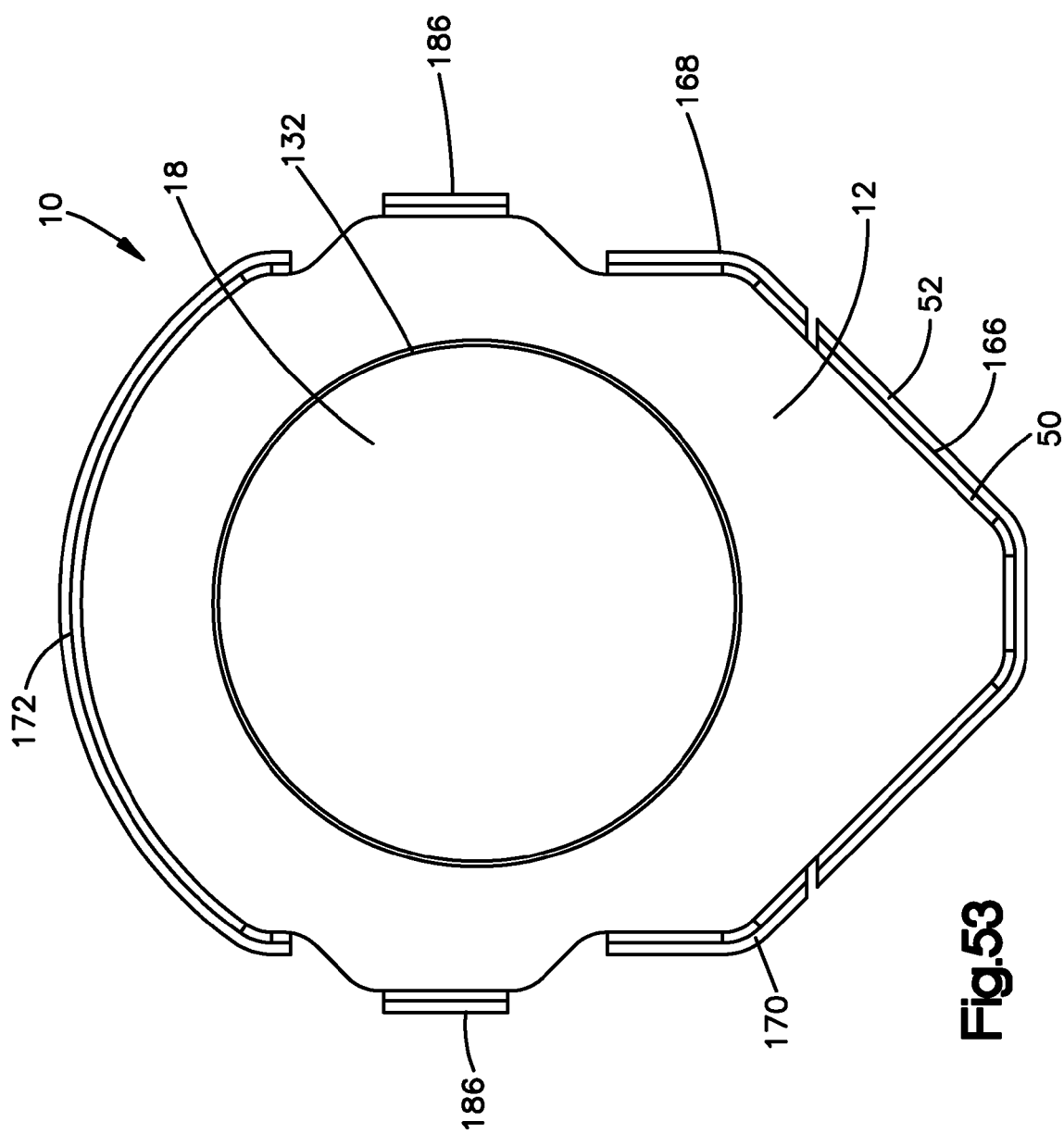
FIG. 53 is a rear view of the example conduit sleeve of FIG. 50.

FIG. 53 shows the rear face 34 of the flange 14. A central portion 18 is demarcated by a score line 132. The user cuts along the score line 132 after the conduit sleeve 10 has been set into the concrete 24 to open the pass through 22. The angles of the pleats 64, discussed above, can range in size. However, one example angle 188 is 40 degrees for the forward most pleat 154 and the other angle 190 is 40 degrees for the rearward pleat 160. Other angles can be used, and it is not required that the angles be the same.

Because the tubular member 12 has a length, it is somewhat forgiving in terms of the length of the adjoining conduit 16. A typical beam or wall 26 will have six or more pass throughs 22 and will also have some variation in its width. As long as the width does not vary significantly, conduits 16 can be cut to fit the average width and any variations in width can be taken up by the length of the tubular member 12 of the conduit sleeve 10. Thus, the tubular member 12 provides some width flexibility for the space being traversed.

The term "substantially," if used herein, is a term of estimation. While various features of the claimed invention are presented above, it should be understood that the features may be used singly or in any combination thereof. Therefore, the claimed invention is not to be limited to only the specific embodiments depicted herein.

Further, it should be understood that variations and modifications may occur to those skilled in the art to which the claimed invention pertains. The embodiments described herein are exemplary of the claimed invention. The disclosure may enable those skilled in the art to make and use embodiments having alternative elements that likewise correspond to the elements of the invention recited in the claims. The intended scope of the invention may thus include other embodiments that do not differ or that insubstantially differ from the literal language of the claims. The scope of the present invention is accordingly defined as set forth in the appended claims.

What is claimed is:

1. A conduit sleeve for a concrete pass through comprising:
   a tubular member having a forward end, a rearward end, and an inside diameter for receiving a cylindrical conduit at the forward end;
   a flange coupled to the rearward end of the tubular member, said flange for coupling to a concrete form; and
   a pivoting structure coupling the tubular member with the flange for allowing the flange to be angled relative to the tubular member.

2. The conduit sleeve of claim 1, wherein the pivoting structure comprises a pleat.

3. The conduit sleeve of claim 2, wherein the pleat is positioned on the tubular member.

4. The conduit sleeve of claim 2, wherein the pivoting structure comprises two or more pleats.

5. The conduit sleeve of claim 4, wherein a first pleat has a first inner diameter and a second pleat has a second inner diameter, and the first and second inner diameters are different from one another.

6. The conduit sleeve of claim 2, wherein the pleat faces rearward of the flange, the flange has a central portion that is removable in order to expose an interior of the tubular member, and the pleat is positioned adjacent the central portion of the flange.

7. The conduit sleeve of claim 1, wherein the pivoting structure permits the tubular member to be angled up to 30 degrees relative to the plane of the flange.

8. The conduit sleeve of claim 1, wherein the flange includes a top portion, a bottom portion, a thinned portion defined between the top portion and the bottom portion, and a central portion that is removable to expose an interior of the tubular member, with the thinned portion providing a fold line where the top portion may be folded over the concrete form at an angle relative to the bottom portion.

9. The conduit sleeve of claim 1, further comprising a plurality of forwardly facing tabs coupled to the flange.

10. The conduit sleeve of claim 9, wherein the tabs are positioned around at least part of the periphery of the flange and extend at an angle relative to a plane of the flange.

11. The conduit sleeve of claim 10, wherein the angle of the tabs relative to the plane of the flange is other than 90 degrees.

12. The conduit sleeve of claim 9, further comprising a plurality of fingers corresponding to the plurality of tabs, with each finger projecting from a corresponding tab at an angle to the corresponding tab.

13. The conduit sleeve of claim 1, wherein the flange includes a plurality of through holes for receiving a fastener to couple the flange to the concrete form and further comprising a recessed portion that surrounds each hole and that allows a fastener to slip through the hole upon application of sufficient force.

14. A conduit sleeve system for defining a pass through in a concrete structure, comprising:
   first and second conduit sleeves having first and second tubular members, first and second flanges, and first and second pivoting structures according to claim 1; and
   a conduit positioned between the first and second conduit sleeves, wherein a first end of the conduit is positioned in the first tubular member of the first conduit sleeve, a second end of the conduit is positioned in the second tubular member of the second conduit sleeve, and the first flange of the first conduit sleeve faces in a first direction, the second flange of the second conduit sleeve faces in a second direction, and the first and second directions are opposite one another.

* * * * *